(12) United States Patent
Fuse et al.

(10) Patent No.: US 8,465,115 B2
(45) Date of Patent: Jun. 18, 2013

(54) IMAGE RECORDING APPARATUS AND IMAGE PROCESSING METHOD

(75) Inventors: Koji Fuse, Tokyo (JP); Takashi Ochiai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 12/615,038

(22) Filed: Nov. 9, 2009

(65) Prior Publication Data
US 2010/0118318 A1    May 13, 2010

(30) Foreign Application Priority Data

Nov. 11, 2008  (JP) ................................. 2008-288967
Oct. 23, 2009  (JP) ................................. 2009-244716

(51) Int. Cl.
*B41J 29/38*    (2006.01)

(52) U.S. Cl.
USPC .......................................................... 347/14

(58) Field of Classification Search
USPC .......................................................... 347/14
See application file for complete search history.

(56) References Cited

U.S. PATENT DOCUMENTS

| | | | |
|---|---|---|---|
| 6,607,317 B2 * | 8/2003 | Morozumi et al. | 400/82 |
| 2004/0041863 A1 * | 3/2004 | Ioka et al. | 347/10 |
| 2004/0155924 A1 * | 8/2004 | Mitsuzawa et al. | 347/40 |
| 2006/0279606 A1 * | 12/2006 | Jahana et al. | 347/47 |
| 2008/0018690 A1 * | 1/2008 | Nishida | 347/18 |

FOREIGN PATENT DOCUMENTS

JP    2002-292859 A    10/2002

* cited by examiner

*Primary Examiner* — Laura Martin
(74) *Attorney, Agent, or Firm* — Canon USA Inc IP Division

(57) ABSTRACT

An image recording apparatus acquires, from image data, gradation information in a region corresponding to a connected portion at which recording chips are overlapped with each other, sets, based on the acquired gradation information, control information for controlling recording rates of respective recording elements of a plurality of recording chips that are connected in an overlapped state, and according to the set control information, generates, from the image data, dot data for respective recording elements of the plurality of recording chips that are connected in the overlapped state.

16 Claims, 21 Drawing Sheets

IMAGE RECORDING APPARATUS AND IMAGE PROCESSING METHOD

BACKGROUND OF THE INVENTION

1. Field of the Invention

The present invention relates to a recording head that includes a plurality of recording chips equipped with recording element arrays, wherein the plurality of recording chips are partly overlapped and mutually connected in a direction parallel to the recording element arrays. When an image recording apparatus records an image on a recording medium, the image recording apparatus generates dot data for the recording head.

2. Description of the Related Art

Image recording apparatuses are generally configured to record images (including characters and marks) on recording media (e.g., sheets) based on recording information. The image recording apparatuses can be classified into an inkjet type, a wire dot type, a thermal type, a laser beam type, or another type, according to the type of recording.

An inkjet type recording apparatus (i.e., an inkjet recording apparatus) includes an inkjet recording head (hereinafter, simply referred to as a "recording head"), which can serve as a recording unit. The recording head has recording elements that can discharge ink toward a recording medium to record an image.

A serial type inkjet recording apparatus can perform a recording operation with a recording head that performs scanning in a main scanning direction perpendicular to a conveyance direction of a recording medium (i.e., a sub scanning direction). The serial type inkjet recording apparatus causes a recording head to move along a recording medium to record an image on the recording medium.

More specifically, each time when the recording head finishes a recording operation corresponding to one complete main scanning, the serial type inkjet recording apparatus conveys the recording medium by a predetermined amount in the sub scanning direction. The serial type inkjet recording apparatus repeats the above-described operation to complete the recording on the entire region of the recording medium.

A full line type inkjet recording apparatus includes a recording head whose recording width is comparable to the width of a recording medium. The full line type inkjet recording apparatus is configured to continuously perform a recording operation for one complete line without moving the recording head, while conveying the recording medium. The full line type inkjet recording apparatus is advantageous in speedily accomplishing image formation processing, and can be adequately used as a recording apparatus dedicated to the on demand type recording services, whose needs are recently increasing, for example, as discussed in Japanese Patent Application Laid-Open No. 2002-292859.

However, in manufacturing the recording head to be incorporated in the above-described full line type recording apparatus, it is difficult to accurately produce all of the inkjet recording elements without any defects, so as to be sequentially disposed in a long length comparable to the entire width of a recording region of a recording medium.

For example, when the full line type recording apparatus performs recording on a sheet of A3 size paper so as to realize a resolution level of 1200 dpi, a full line type recording head is required to include approximately 14 thousands of recording elements (approximately 280 mm in recording width). It is generally difficult to manufacture all of such numerous recording elements without any defects. Even if the manufacturing of the above-described recording head can be successfully accomplished, an efficiency percentage may be low and manufacturing costs may increase.

For the reasons described above, a long connected head is proposed as a prospective full line type recording head. The connected head is a recording head including a plurality of recording element arrays, each including a plurality of recording elements, which are continuously or sequentially disposed in the direction parallel to the recording element arrays.

More specifically, the connected head is a recording head including a plurality of short heads (i.e., the heads used in the above-described serial type inkjet recording apparatus), which are connected in the direction parallel to the recording element arrays to realize an elongated head configuration. Similarly, the serial type recording apparatus can use a long recording head to perform recording if the long recording head can be realized by the above-described connecting configuration.

However, an image generated by the connected head may include undesirable streaks in a region corresponding to a connected portion extending between two recording element arrays where edges of two recording element arrays are overlapped with each other. In general, such undesirable streaks appear in an image region corresponding to a connected portion extending between two recording element arrays when an impact position of a coloring material recorded by a recording element array deviates from a correct position. For example, the impact position of a coloring material deviates from the correct position when the mounting location of a recording element array deviates from a predetermined position, or when the recording element array is mounted in an inclined state (i.e., when the recording head is mounted in an inclined state).

FIG. 1 illustrates a positional relationship between a recording head 101, which is in an ideal state where no deviation occurs in impact position of ink, and a dot layout pattern that can be recorded by respective recording element arrays (i.e., a first recording element array 102 and a second recording element array 103). A right-side schematic illustration in FIG. 1 is an example pattern of ideal dots that do not generate any streaks appearing in an image region corresponding to a connected portion extending between two recording element arrays.

In FIG. 1, a direction X indicates a conveyance direction of a recording medium and a direction Y indicates a direction perpendicular to the direction X. Each of the recording element arrays constituting the recording head 101 (i.e., the first recording element array 102 and the second recording element array 103) extends in the direction Y. In general, the size of each dot is sufficiently large so that neighboring dots can be overlapped with each other. However, for the sake of convenience, the dots illustrated in FIG. 1 are smaller ones.

On the other hand, FIG. 2 illustrates an example pattern of dots in a case where a mounting location of the second recording element array 103 deviates from the ideal position, according to which streaks are generated in an image region corresponding to a connected portion extending between two recording element arrays due to a deviation in ink impact position caused by the mounting deviation of the second recording element array 103.

In FIG. 2, the mounting location of the second recording element array 103 relative to the first recording element array 102 is shifted from an ideal position toward a positive direction in the direction Y. Therefore, the density of dots decreases in the image region corresponding to the connected portion extending between two recording element arrays. In other words, white streaks appear in the image region corresponding to the connected portion extending between two recording element arrays.

FIG. 3 illustrates an example pattern of dots in a case where the recording head 101 is inclined, according to which streaks are generated in an image region corresponding to a connected portion extending between two recording element arrays due to a deviation in ink impact position. In FIG. 3, the recording head 101 is inclined in the clockwise direction relative to the vertical direction of an XY plane.

As a result, direction Y positions of the dots recorded by the second recording element array 103 are shifted toward a positive direction relative to direction Y positions of the dots recorded by the first recording element array 102. Therefore, the dot density decreases in an image region corresponding to a connected portion extending between two recording element arrays. In other words, white streaks appear in the image region corresponding to the connected portion extending between two recording element arrays.

There are some conventional methods available to prevent the above-described streaks from appearing in an image region corresponding to a connected portion extending between two recording element arrays. For example, a conventional method for accurately arranging the recording chips in the connected portion is available. This method can reduce a deviation in pitch of respective recording elements.

Further, there is another conventional method for reducing or weakening the streaks appearing in the image region corresponding to the connected portion extending between two recording element arrays by controlling the number of dots to be recorded by each recording element array that constitutes the connected portion as illustrated in FIG. 1.

However, if the chip arrangement in the connected portion is accurately performed, manufacturing costs increase significantly. Further, if a correction is performed by appropriately increasing or reducing the number of recording dots to be used by each recording element array that constitutes the connected portion, it is necessary to individually determine an appropriate correction amount according to each gradation for all pixels. Therefore, a complicated configuration is required.

SUMMARY OF THE INVENTION

Exemplary embodiments of the present invention are directed to an image recording apparatus that can prevent undesirable streaks from being generated in an image region corresponding to a connected portion extending between two recording element arrays when the image recording apparatus records an image with a long recording head including a plurality of recording chips that are connected with each other.

According to an aspect of the present invention, an image recording apparatus is configured to record an image on a recording medium using a recording head having a plurality of recording chips that are equipped with recording element arrays, wherein the recording chips are partly overlapped and are connected in a direction parallel to the recording element arrays. The image recording apparatus includes an acquisition unit configured to acquire, from image data, gradation information in a region corresponding to a connected portion at which the recording chips are overlapped with each other, a setting unit configured to set, based on the gradation information, control information for controlling recording rates of respective recording elements of the plurality of recording chips that are connected in an overlapped state, and a generation unit configured to, according to the set control information, generate, from the image data, dot data for respective recording elements of the plurality of recording chips that are connected in the overlapped state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 4:
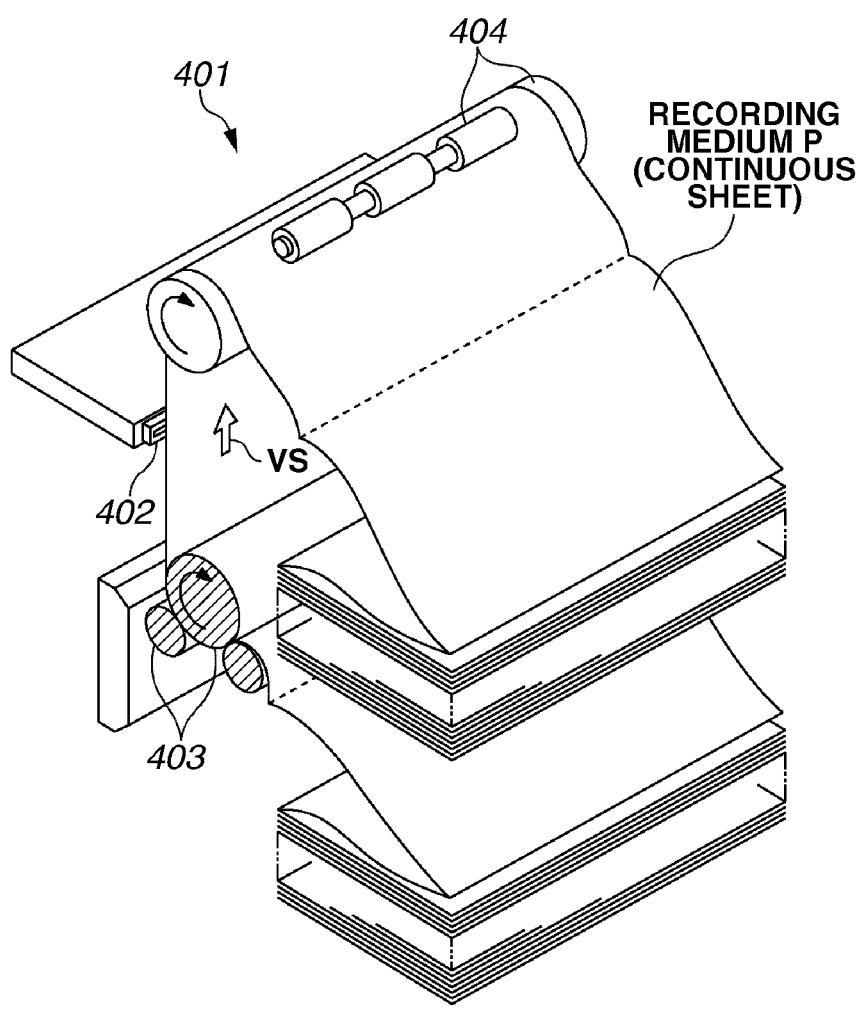
FIG. 4 is a perspective view illustrating an example of a configuration of principal parts that constitute an inkjet type line printer according to a first exemplary embodiment of the present invention.

FIG. 4 is a perspective view illustrating an example of a configuration of principal parts of an inkjet recording apparatus 401 according to a first exemplary embodiment of the present invention. The recording apparatus 401 includes a recording head (i.e., a full line recording head) 402 that is disposed in a long range comparable to the entire width of a recording medium, such as a recording medium P (e.g., a continuous sheet), and can discharge ink onto the surface of the recording medium P.

The recording head 402 includes a plurality of recording element arrays fixed thereon. Each recording element constituting a recording element array can discharge an ink droplet toward the recording medium P at predetermined timing.

The recording apparatus 401 further includes a plurality of conveyance rollers 403 and discharge rollers 404. When the conveyance rollers 403 and the discharge rollers 404 are driven by a driving motor (not illustrated), the recording medium P can be conveyed in a direction indicated by arrow VS.

Figure 5:
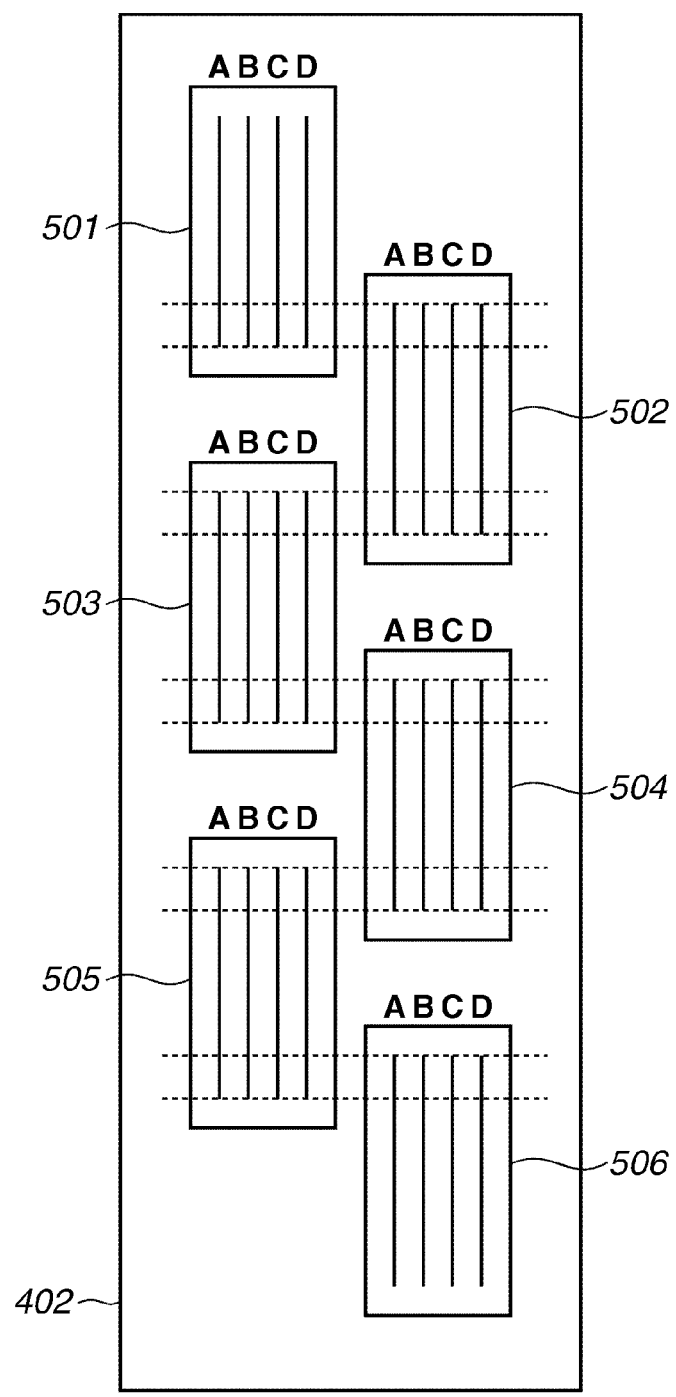
FIG. 5 is a see-through view illustrating a detailed configuration of a recording head according to the first exemplary embodiment.

FIG. 5 is a see-through view illustrating a detailed configuration of the recording head 402 illustrated in FIG. 4. The recording head 402 is a recording head having an elongated shape. The recording head 402 includes a plurality of recording chips 501, 502, 503, 504, 505, and 506 that are disposed to be connected in a longitudinal direction thereof. Each recording chip includes four recording element arrays that are disposed in parallel with each other to constitute four rows A to D.

The recording element array that constitutes the row A can be used to perform recording with a black ink. The recording element array that constitutes the row B can be used to perform recording with a cyan ink. The recording element array that constitutes the row C can be used to perform recording with a magenta ink. The recording element array that constitutes the row D can be used to perform recording with a yellow ink.

The recording element arrays of the recording chips 501 to 506 are partly overlapped in a direction parallel to the longitudinal direction of each recording chip. In the following description, a recording head including a plurality of recording chips sequentially disposed thereon is referred to as a connected head.

Figure 6:
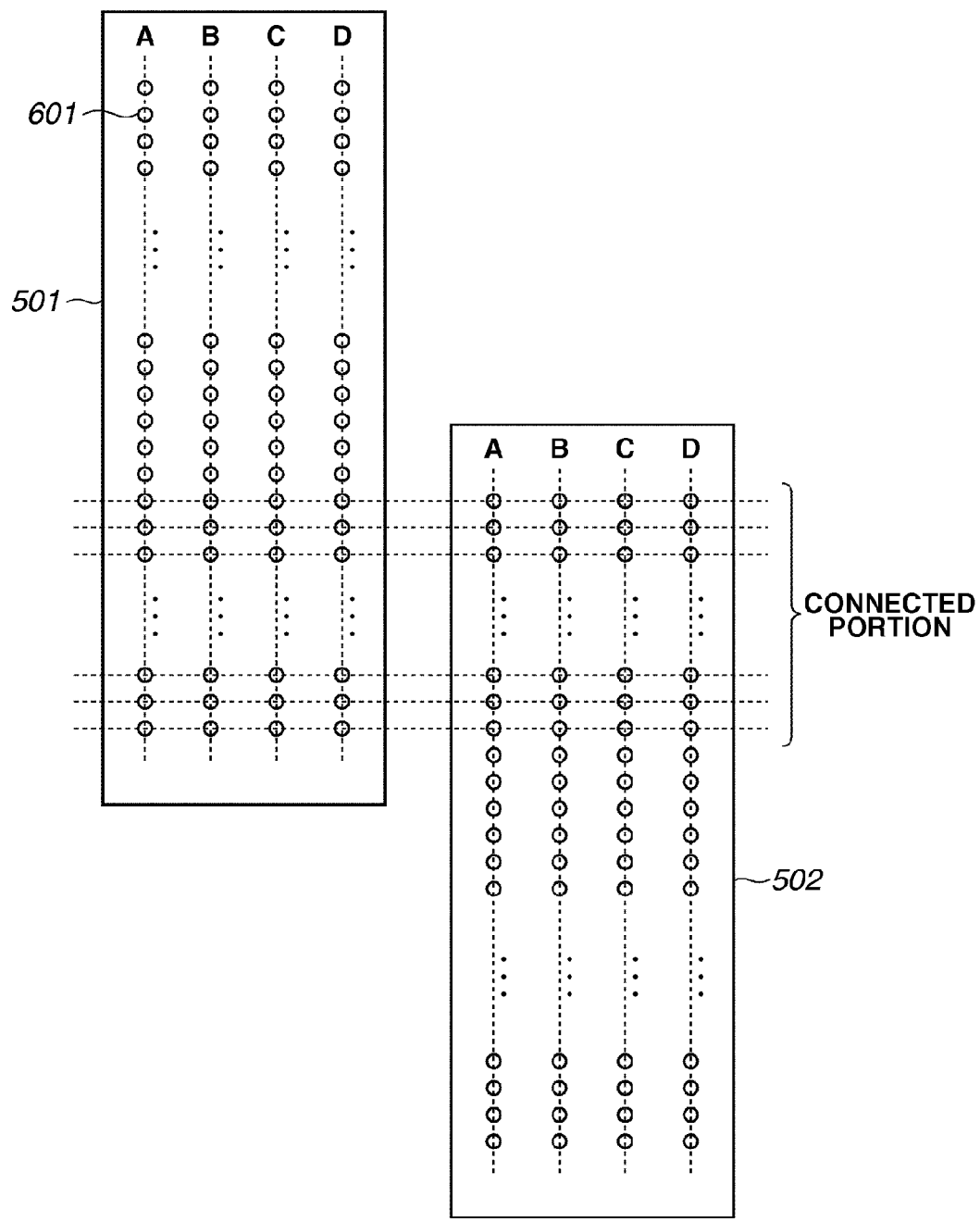
FIG. 6 is a schematic view illustrating a detailed configuration of a connected portion extending between two recording chips.

FIG. 6 is a schematic view illustrating a detailed configuration of a connected portion laterally extending between the recording chip 501 and the recording chip 502 illustrated in FIG. 5. The connected portion extending between two recording chips 501 and 502 illustrated in FIG. 6 is one of a plurality of connected portions provided on the recording head 402.

Each of four recording element arrays A to D, which cooperatively constitute a single recording chip, includes one thousand and twenty-four recording elements 601 that are sequentially disposed to realize a resolution level of 1200 dpi. Further, the length of the connected portion along which two recording chips 501 and 502 are overlapped with each other is equivalent to forty recording elements. FIG. 6 includes an expression " . . . " that represents recording elements whose illustrations are omitted because all of numerous recording elements cannot be thoroughly illustrated in a limited space on the drawing plane.

In the present exemplary embodiment, four recording elements of the recording chip 501 and four recording elements of the recording chip 502 are aligned straight on the same recording line in the connected portion where the recording chips 501 and 502 are overlapped with each other. However, the arrangement of the recording elements of two recording chips 501 and 502 is not limited to the arrangement illustrated in FIG. 6.

For example, another configuration available for the recording elements of two recording chips 501 and 502 can double the recording resolution in the connected portion by mutually shifting the recording elements by a half pitch. Yet, another configuration available for the recording elements of two recording chips 501 and 502 can be a specific configuration that can realize a resolution variable depending on the position of respective recording elements in the connected portion.

Further, the resolution according to which a plurality of recording elements are disposed, the number of a plurality of recording elements to be assembled as a recording element array, and the number of a plurality of recording elements to be overlapped in the connected portion can be arbitrarily determined.

In the following description, a portion where recording element arrays are overlapped with each other is referred to as a connected portion. A portion other than the connected portion is referred to as a non-connected portion. An example of image processing for the connected portion is described below.

Figure 1:
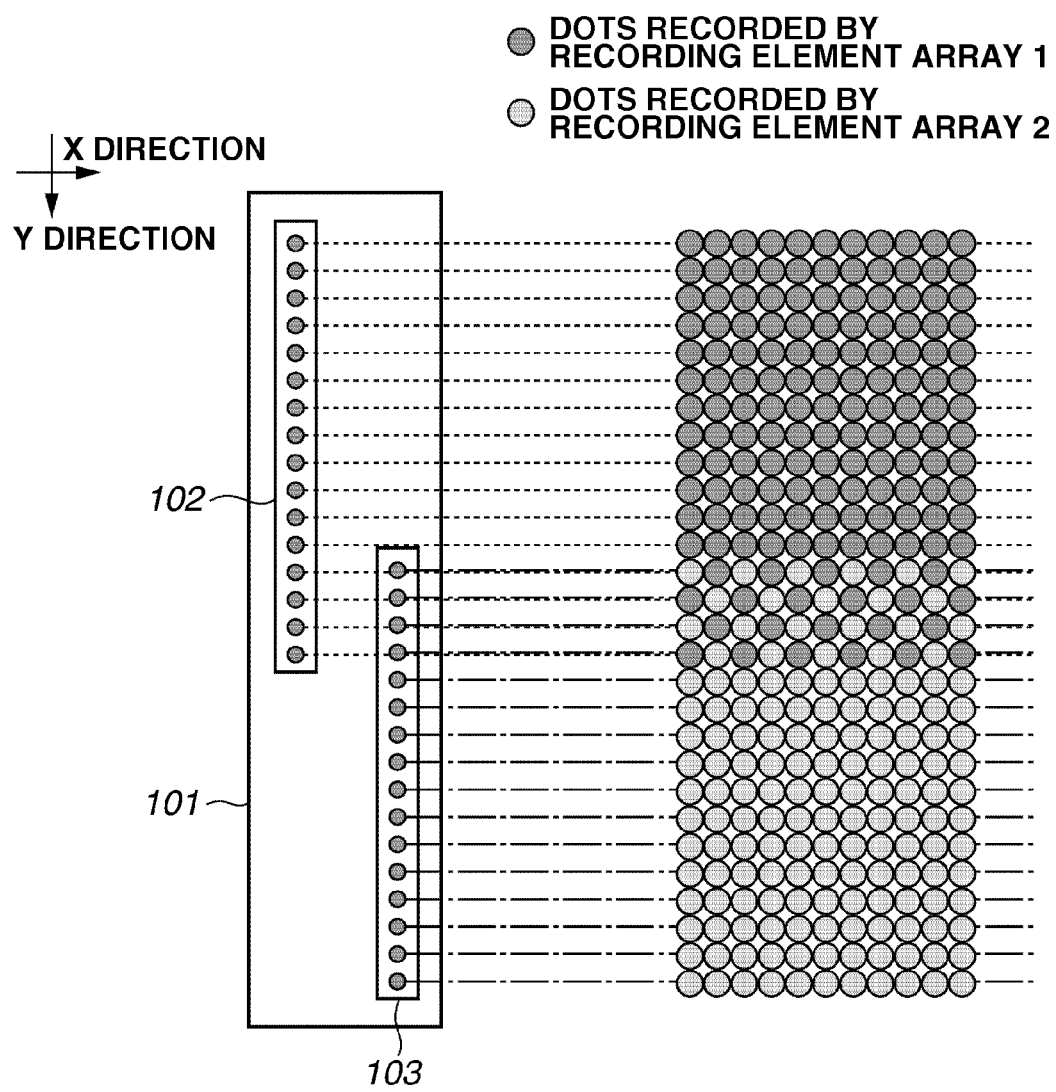
FIG. 1 is a schematic view illustrating a positional relationship between a recording head, which is in an ideal state where no deviation occurs in impact position, and a dot layout pattern that can be recorded by respective recording element arrays.
Figure 2:
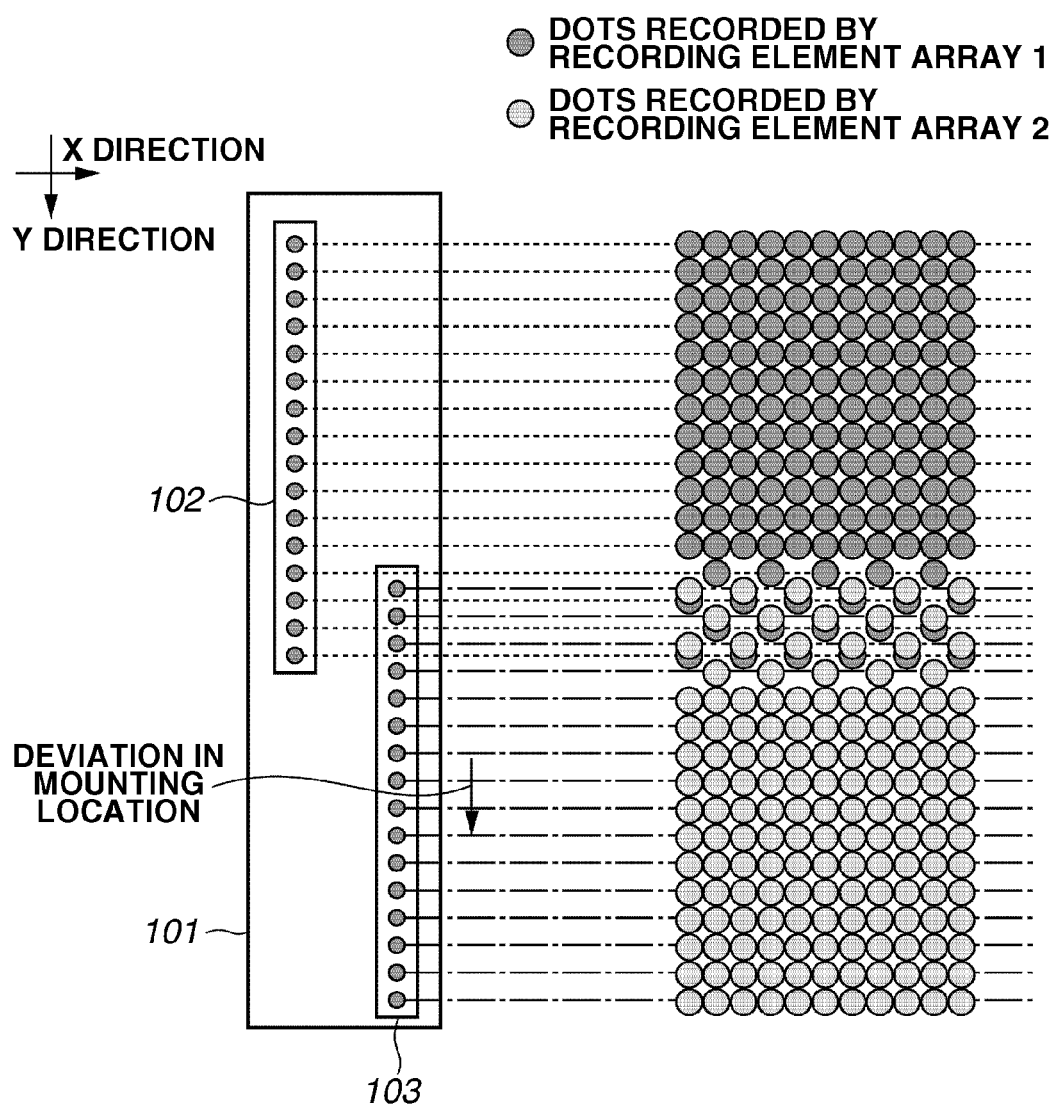
FIG. 2 is a schematic view illustrating an example of a dot pattern in a case where streaks are generated in an image region corresponding to a connected portion extending between two recording element arrays due to a deviation in ink impact position that may be caused by the deviation of amounting location of the second recording element array.
Figure 3:
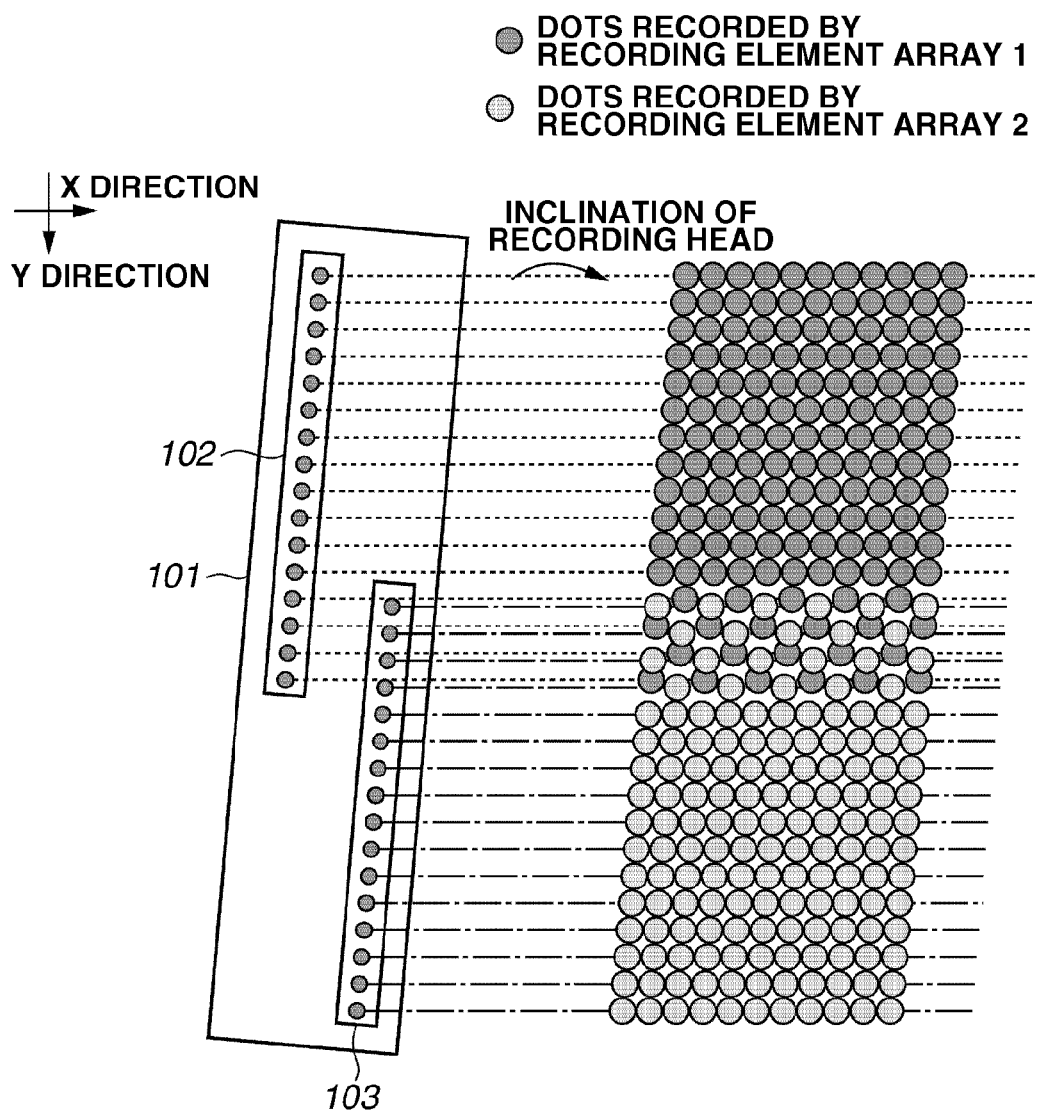
FIG. 3 is a schematic view illustrating an example of a dot pattern in a case where streaks are generated in an image region corresponding to a connected portion extending between two recording element arrays due to a deviation in ink impact position that may be caused by the inclination of the recording element arrays.

When a binary dot layout pattern is recorded with the connected head, it is useful to distribute the dot layout pattern to be recorded in the connected portion to each recording element array that constitutes the connected portion illustrated in FIG. 1.

In the present exemplary embodiment, the dot layout pattern to be recorded in the connected portion can be distributed to respective recording element arrays through mask processing using mask patterns (hereinafter, referred to as connection masks) that are constructed by binary (i.e., "1" or "0") data. The mask processing to be performed in the present exemplary embodiment is processing for obtaining a logical AND of the dot layout pattern configured by binary ("1" or "0") data and the connection mask.

Figure 7:
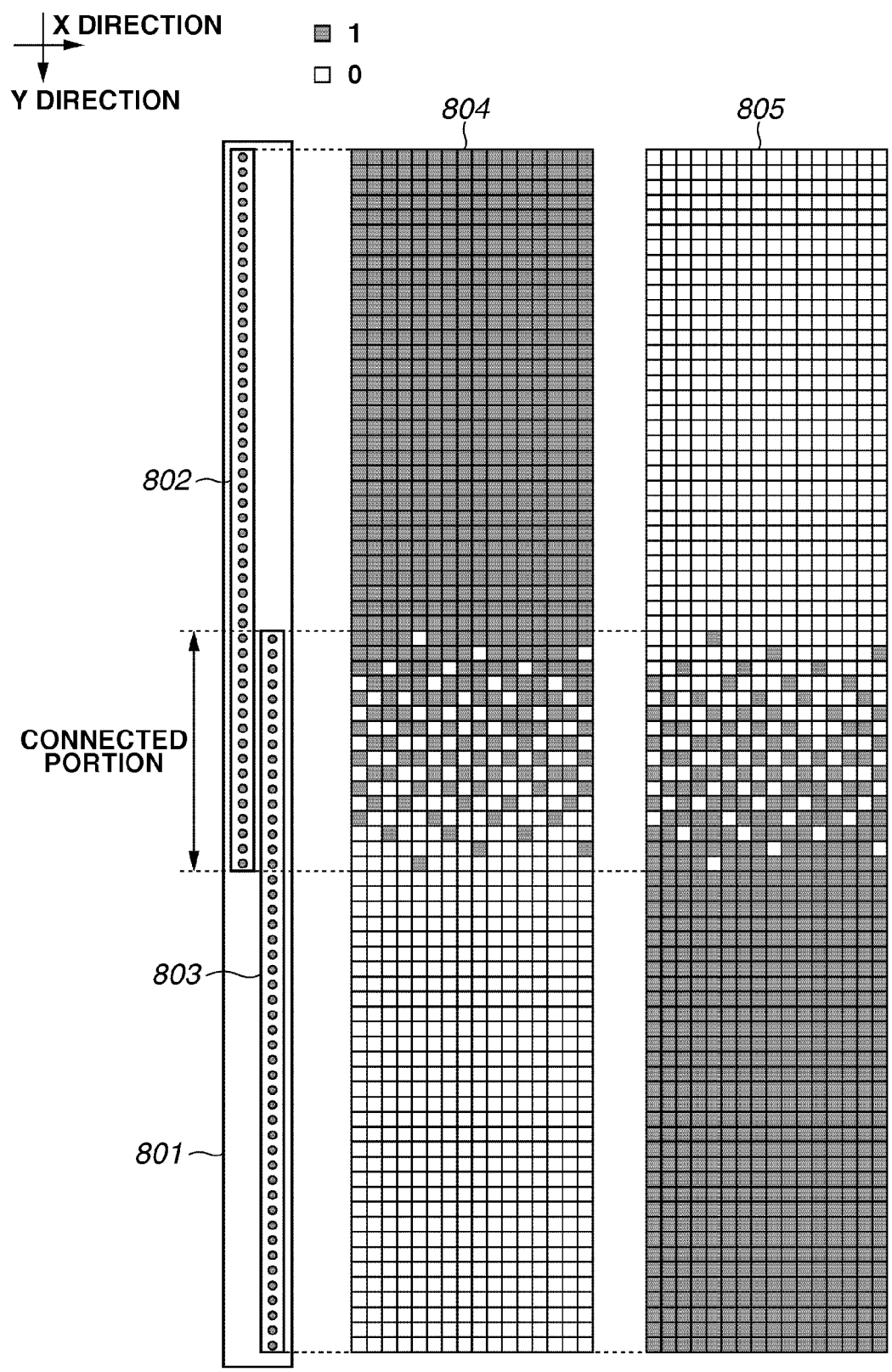
FIG. 7 is a schematic view illustrating a positional relationship between a recording head and connection masks according to the first exemplary embodiment, and an example configuration of the connection masks.

FIG. 7 illustrates a positional relationship between a recording head and connection masks and an example configuration of the connection masks. A recording head 801 includes a first recording element array 802 and a second recording element array 803.

A connection mask 804 is a connection mask for the first recording element array 802. A connection mask 805 is a connection mask for the second recording element array 803. In FIG. 7, the direction X indicates a conveyance direction of a recording medium and the direction Y indicates a direction along which each recording element array extends straight.

For the sake of convenience, each recording element array illustrated in FIG. 7 includes a smaller number of recording elements. More specifically, each recording element array includes 48 recording elements, and 16 recording elements are allocated to the connected portion.

The size of each connection mask is 16 pixels in the direction X and 48 pixels in the Y direction. A combination of the connection mask 804 and the connection mask 805 (i.e., one set of connection masks) can be used to perform mask processing for distributing a dot layout pattern in the same region of a recording medium.

To simplify the following description, a recording head described below performs recording with a single coloring material. However, in a case where a recording head can use a plurality of coloring materials (see FIG. 5) for recording, the above-described distribution processing using the connection masks is performed for each coloring material.

Figure 8:
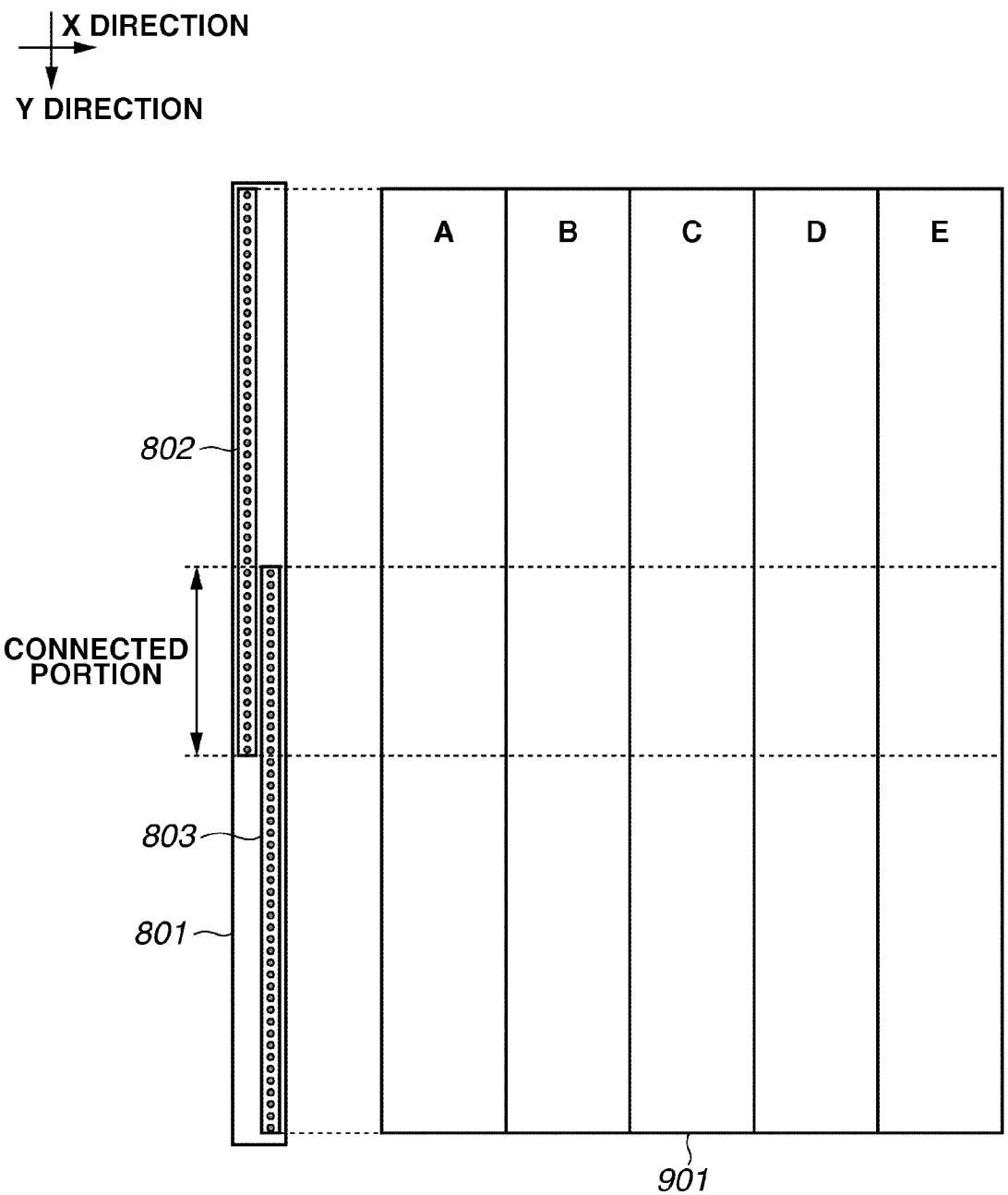
FIG. 8 is a schematic view illustrating an example of a recording medium, which is divided into a plurality of regions to which one set of connection masks can be applied.

FIG. 8 is a schematic view illustrating the entire region of a recording medium 901, which is divided into a plurality of regions to which the combination of the connection mask 804 and the connection mask 805 (i.e., one set of connection masks) illustrated in FIG. 7 can be applied.

More specifically, each of five regions A to E illustrated in FIG. 8 is a region to which the above-described one set of connection masks can be applied. The size of each region is 16 pixels in the direction X and 80 pixels in the direction Y. As illustrated in FIG. 8, in a case where the size of a recording region is larger than the size of the connection masks, the connection masks can be periodically and repetitively applied to the entire recording region.

In this case, the connection masks to be applied to respective regions A to E can be varied in mask pattern. For example, in a case where three types of connection masks (e.g., a connection mask "a", a connection mask "b", and a connection mask "c"), which are different in binary ("1" and "0") pattern in the connected portion, are provided, the connection mask "a" can be applied to the region A, the connection mask "b" can be applied to the region B, and the connection mask "c" can be applied to the remaining regions C to E.

Next, a recording rate of each recording element, which is dependent on a mask pattern of each connection mask, is described below. The recording rate of each recording element can be determined based on the data "1", which is present in a direction perpendicular to the recording element array in the connection mask. For example, in FIG. 7, the recording rates of recording elements in a non-connected portion are 100% because the data existing in the direction X (i.e., the direction perpendicular to the recording element array) is all "1."

On the other hand, in FIG. 7, the recording rates of recording elements in the connected portion are less than 100% because the data existing in the direction X (i.e., the direction perpendicular to the recording element array) is a mixture of two pieces of data ("1" and "0"). Further, in FIG. 7, the connection mask 804 for the first recording element array and the connection mask 805 for the second recording element array are in a mutually exclusive relationship with respect to their patterns in the connected portion. Therefore, the sum of a recording rate by the connection mask 804 and a recording rate by the connection mask 805 is equal to 100%.

Figure 9:
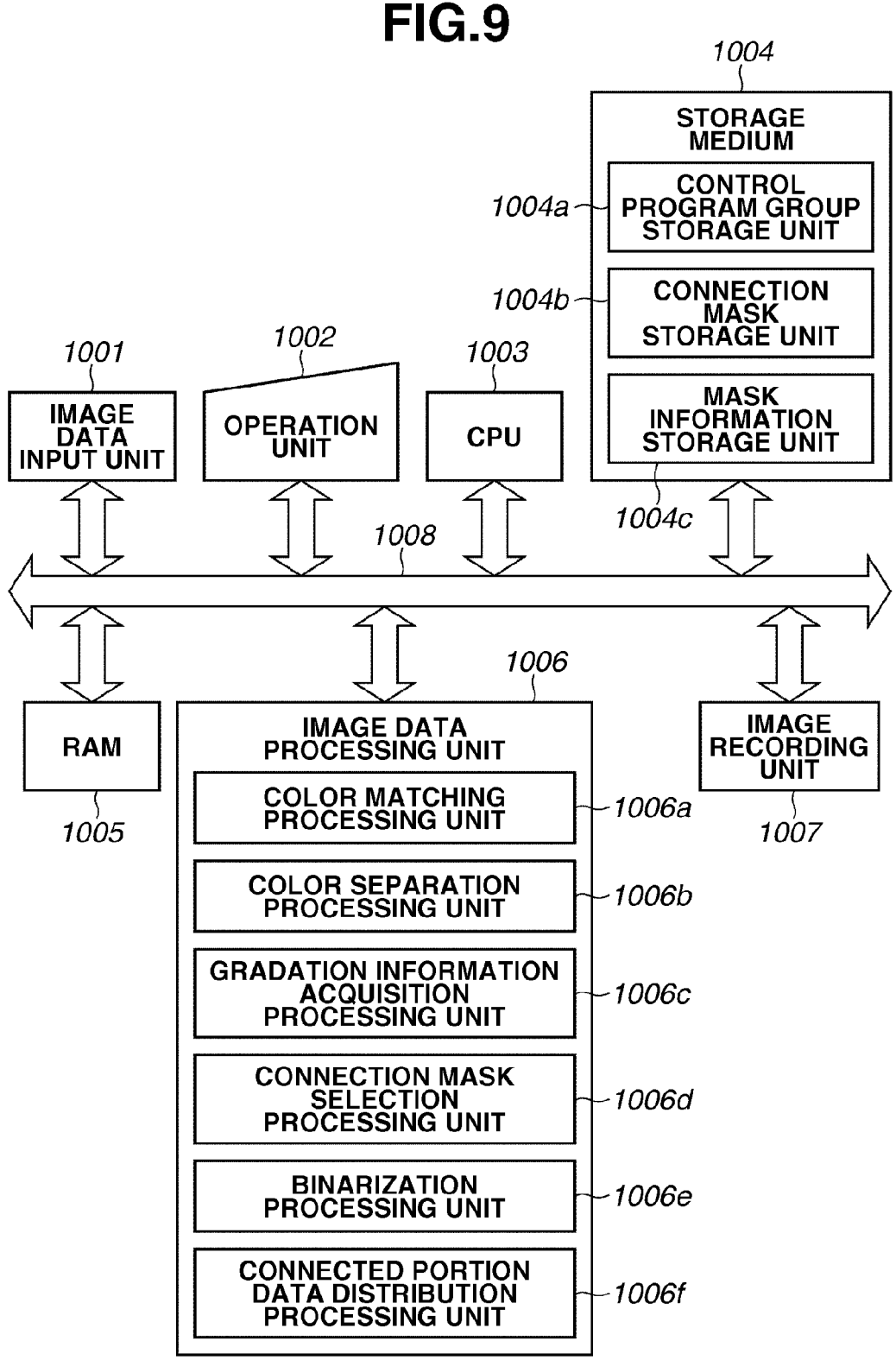
FIG. 9 is a block diagram illustrating an example of a configuration of a control system for an inkjet recording apparatus according the first exemplary embodiment.

FIG. 9 is a block diagram illustrating an example of a configuration of a control system for the inkjet recording apparatus according to the first exemplary embodiment.

An image data input unit 1001 can input multi-valued image data from an image input device, such as a scanner or a digital camera. The image data input unit 1001 can further input multi-valued image data from a hard disk of a personal computer. An operation unit 1002 is equipped with various keys that can be operated by a user to perform setting of various parameters and instruct starting a recording operation.

A central processing unit (CPU) 1003 can control various operations to be performed by the recording apparatus according to various programs stored in a storage medium 104. A random access memory (RAM) 1005 can be used as a work area for various programs stored in the storage medium 1004, a temporary save area in error processing, and a work area in image processing.

An image recording unit 1007 can generate a driving signal to be supplied to a recording element so that each dot can be printed at a desired position based on a binary dot layout pattern generated by an image data processing unit 1006. A bus line 1008 can transmit address signals, data, and control signals that are used or processed in the apparatus. The storage medium 1004 stores control programs and connection mask data.

The storage medium 1004 includes a control program group storage unit 1004a, a connection mask storage unit 1004b, and a mask information storage unit 1004c. The control program group storage unit 1004a can store various programs that can be used to control the recording apparatus according to the present exemplary embodiment.

The connection mask storage unit 1004b can store a plurality of connection masks that are mutually different in mask pattern. In the present exemplary embodiment, the connection mask storage unit 1004b stores a plurality of connection masks that are different in recording rate. The number of the connection masks stored in the connection mask storage unit 1004b can be arbitrarily determined. In the present exemplary embodiment, the connection mask storage unit 1004b stores three connection masks (i.e., the connection mask "a", the connection mask "b", and the connection mask "c").

Figure 10:
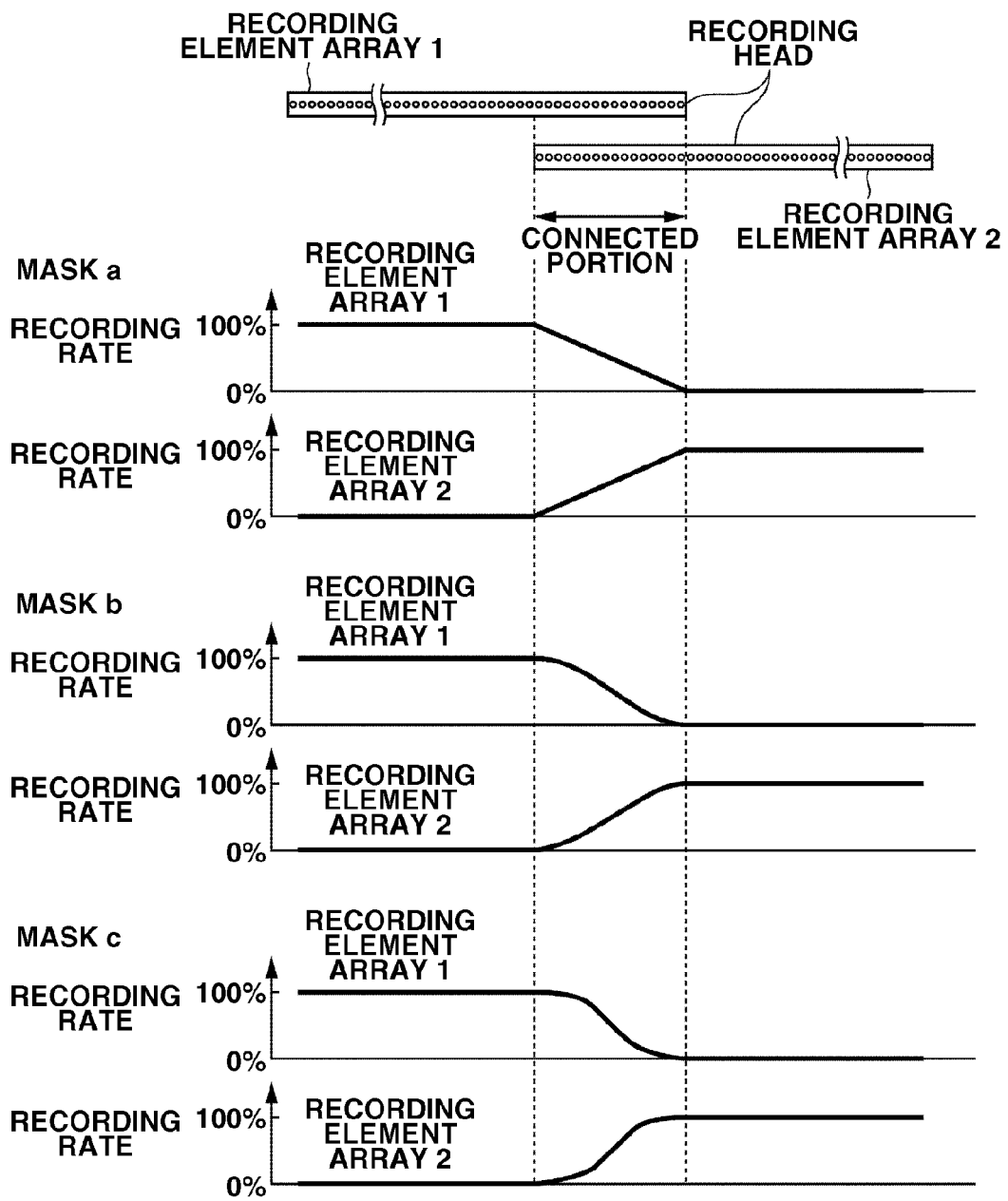
FIG. 10 illustrates three types of connection masks that are different in recording rate in the connected portion.

FIG. 10 illustrates recording rates of the connection mask "a", the connection mask "b", and the connection mask "c" for each of the recording element arrays 1 and 2. These three connection masks are different in maximum change amount of the recording rate in the direction parallel to the recording element array.

In FIG. 10, the abscissa axis of each graph represents the position of each recording element and the ordinate axis of each graph represents the recording rate. In the present exemplary embodiment, the maximum change amount of the recording rate is a maximum inclination amount in each graph of FIG. 10. The connection mask "c" is superior to the connection mask "b" in the maximum change amount of the recording rate. Further, the connection mask "b" is superior to the connection mask "a" in the maximum change amount of the recording rate.

The mask information storage unit 1004c can store measurement results with respect to the visibility of streaks appearing in an image region corresponding to a connected portion extending between two recording element arrays, which can be generated when the plurality of mask patterns stored in the connection mask storage unit 1004b are used to record, with each coloring material, a plurality of pieces of test image data that are different in gradation.

Figure 11:
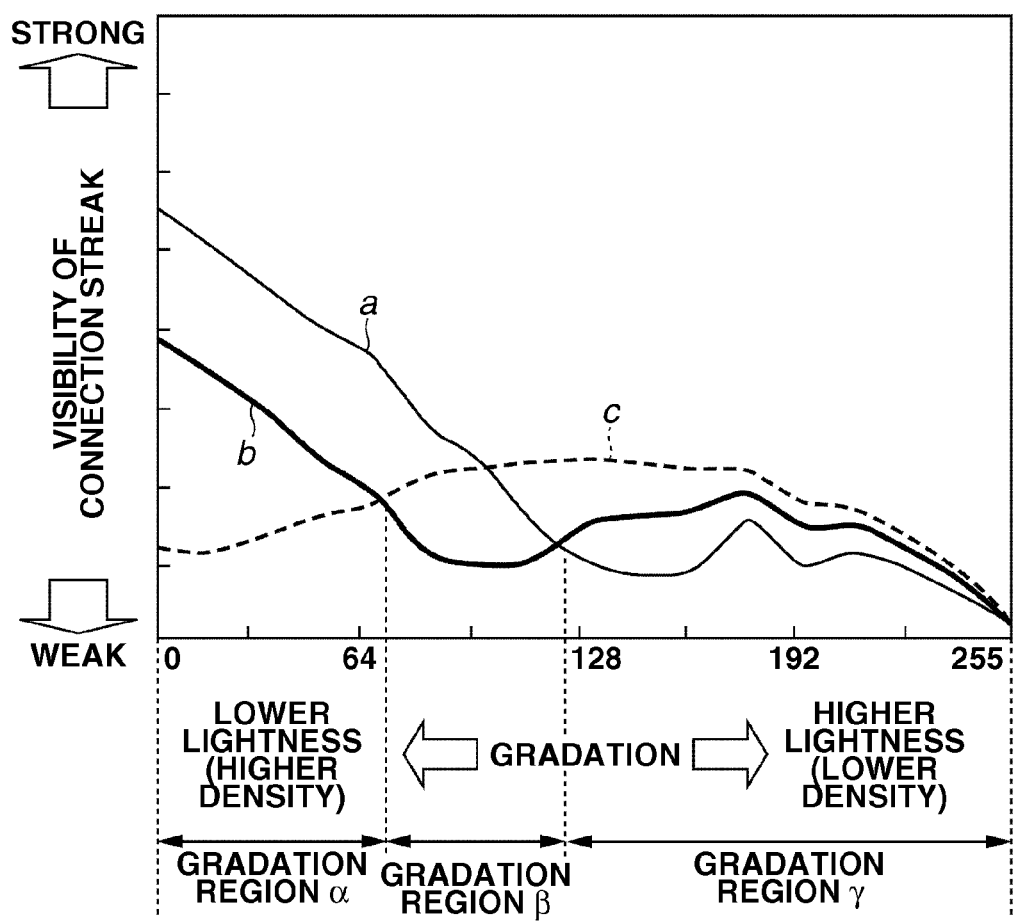
FIG. 11 is a characteristic view illustrating measurement results with respect to the visibility of streaks appearing in an image region corresponding to a connected portion extending between two recording element arrays.

FIG. 11 illustrates evaluation results with respect to the visibility of streaks appearing in an image region corresponding to a connected portion extending between two recording element arrays in a case where the above-described three types of connection masks stored in the connection mask storage unit 1004b are used to record, with a coloring material K, a plurality of pieces of test image data that are different in gradation level. The test image data is monochromatic multi-valued image data, which is color-separated so as to correspond to each ink color. The gradation level is uniform regardless of the location on an image.

In FIG. 11, the abscissa axis represents the gradation level of test image data and the ordinate axis represents the visibility of streaks that appear in an image region corresponding to a connected portion extending between two recording element arrays when the test image data is recorded on a recording medium. According to the evaluation result illustrated in FIG. 11, the lightness is higher as the gradation level is higher. The visibility of streaks has a larger value as stronger streaks appear in an image region corresponding to a connected portion extending between two recording element arrays.

In the evaluation, a plurality of persons can determine a visibility level of streaks appearing in an image region corresponding to a connected portion extending between two recording element arrays based on their own decisions when they have checked an image recorded on a recording medium.

Further, it is useful to obtain a quantized value representing the visibility of streaks appearing in an image region corresponding to a connected portion extending between two recording element arrays, which can be, for example, obtained by evaluating an average density of a recorded image in the direction parallel to the recording element array. The visibility of streaks appearing in the image region corresponding to the connected portion illustrated in FIG. 11 is a result obtained based on an average density of the image recorded on a recording medium in the direction parallel to the recording element array.

Figure 12:
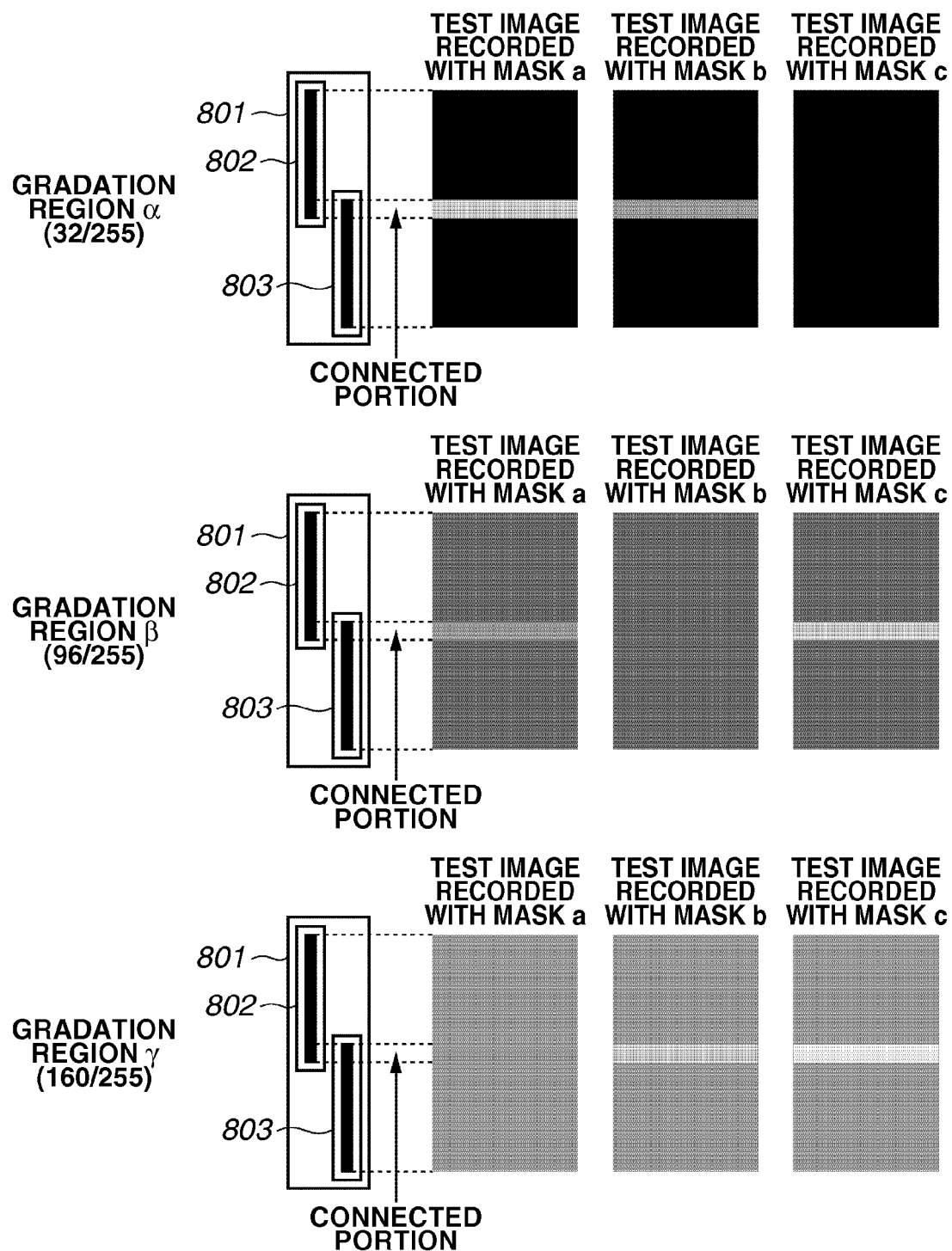
FIG. 12 is a schematic view illustrating examples of streaks that have appeared in an image region corresponding to a connected portion extending between two recording element arrays.

FIG. 12 is a schematic view illustrating examples of the streaks appearing in an image region corresponding to a connected portion extending between two recording element arrays that can be observed in a case where the masks a, b, and c are used to record, with the coloring material K, test image data belonging to a gradation region α (gradation level=32/255), a gradation region β (gradation level=96/255), and a gradation region γ (gradation level=160/255).

In the present exemplary embodiment, a gradation level indicated by 0 corresponds to the maximum density and a gradation level indicated by 255 corresponds to the minimum density (i.e., a level comparable to white paper). It is understood from FIGS. 11 and 12 that the streaks appearing in the image region corresponding to the connected portion can be minimized in a case where the connection mask "c" is used in the gradation region α, and in a case where the connection mask "b" is used in the gradation region β, and further in a case where the connection mask "a" is used in the gradation region γ.

The examples illustrated in FIGS. 11 and 12 are based on the recording performed with the coloring material K. However, in addition to the information relating to the coloring material K, the mask information storage unit 1004c stores information relating to other coloring materials C, M, and Y with respect to the visibility of streaks appearing in an image region corresponding to a connected portion extending between two recording element arrays.

The image data processing unit 1006 can perform various image processing (e.g., color matching processing and color separation processing) on RGB multi-valued data input by the image data input unit 1001. Then, the image data processing unit 1006 can generate a binary dot layout pattern to be recorded by respective recording elements of the connected head. The image data processing unit 1006 includes a color matching processing unit 1006a, a color separation processing unit 1006b, a gradation information acquisition processing unit 1006c, a connection mask selection processing unit 1006d, a binarization processing unit 1006e, and a connected portion data distribution processing unit 1006f.

An example of image data processing that can be performed by the image data processing unit 1006 is described below with reference to a flowchart illustrated in FIG. 13.

In step S1401, the color matching processing unit 1006a maps the multi-valued RGB data input by the image data input unit 1001 into color gamuts that are reproducible by the image recording apparatus. Then, the color matching processing unit 1006a generates multi-valued R', G', and B' data.

In step S1402, the color separation processing unit 1006b generates multi-valued CMYK data that indicates discharge amounts of respective inks based on the multi-valued R', G', and B' data. The color matching processing and the color separation processing are conventionally known although not described in detail in the present embodiment.

In step S1403, the gradation information acquisition processing unit 1006c obtains, for each coloring material, an average value of the multi-valued CMYK data in the connected portion as gradation information in each region (i.e., each of the regions A to E illustrated in FIG. 8) to which one set of connection masks can be applied. More specifically, the gradation information acquisition processing unit 1006c calculates an average value of image data corresponding to the connected portion for C, M, Y, and K in each of the regions A to E.

Next, in step S1404, the connection mask selection processing unit 1006d performs processing for setting connection masks based on the gradation information as control information for controlling recording rates of respective coloring materials in each region. More specifically, the connection mask selection processing unit 1006d selects a connection mask corresponding to each coloring material of each region from a plurality of masks stored in the connection mask storage unit 1004b, based on an average value of each coloring material, referring to the information stored in the mask information storage unit 1004c, so that the streaks appearing in a recorded image region corresponding to the connected portion can be reduced or weakened.

An example of the processing to be performed by the connection mask selection processing unit 1006d is described below with reference to FIGS. 8 and 11. For example, if an average value of the coloring material K in the connected portion of the region A illustrated in FIG. 8 is in the gradation region γ illustrated in FIG. 11, the connection mask selection processing unit 1006d selects the connection mask "a" for the coloring material K in the region A. Further, in a case where an average value of the coloring material K in the connected portion of the region B is in the gradation region β, the connection mask selection processing unit 1006d selects the connection mask "b" for the coloring material K in region B.

Moreover, in a case where an average value of the coloring material K in the connected portion of respective regions C to E is in the gradation region α, the connection mask selection processing unit 1006d selects the connection mask "c" for the coloring material K in respective regions C to E. Similarly, the connection mask selection processing unit 1006*d* selects a connection mask for each of other coloring materials C, M, and Y referring to an average value in the connected portion of each region.

In step S1405, the binarization processing unit 1006*e* binarizes the multi-valued CMYK data according to an error diffusion method or a dither method. The binarization processing unit 1006*e* generates a binary dot layout pattern that indicates discharge or non-discharge of ink.

In step S1406, the connected portion data distribution processing unit 1006*f* distributes the dot layout pattern, using the selected mask, to respective recording elements of a plurality of recording element arrays that correspond to the connected portion. Then, the connected portion data distribution processing unit 1006*f* generates a binary dot layout pattern to be recorded by the recording elements of each recording element array that constitute the connected head.

As described above, the image recording apparatus according to the first exemplary embodiment can prevent or reduce undesirable streaks from being generated in an image region corresponding to a connected portion extending between two recording element arrays to attain a goal of obtaining high-quality recorded images while realizing speedy recording processing.

Similar to the first exemplary embodiment, a second exemplary embodiment of the present invention can be realized by the inkjet recording apparatus illustrated in FIG. 4. A configuration similar to that described in the first exemplary embodiment is not described below. A configuration different from that described in the first exemplary embodiment is described below.

Connection masks to be used in the present exemplary embodiment are different from the binary masks described in the first exemplary embodiment. The connection masks according to the present exemplary embodiment are multi-valued masks that can distribute input multi-valued data to a plurality of recording element arrays that constitute the connected portion.

The connection mask to be used in the present exemplary embodiment can be constructed by any data that can be represented by real numbers in a range from "0" to "1." Mask processing according to the present exemplary embodiment includes obtaining a product of a multi-valued mask and color separated multi-valued image data to generate distribution-completed multi-valued data corresponding to the plurality of recording element arrays that constitute the connected portion. When the data value is "0", it means that the recording to be performed is nothing. When the data value is "1", it means that the recording to be performed is perfect. The above-described connection masks can be referred to as multi-valued connection masks.

Figure 14:
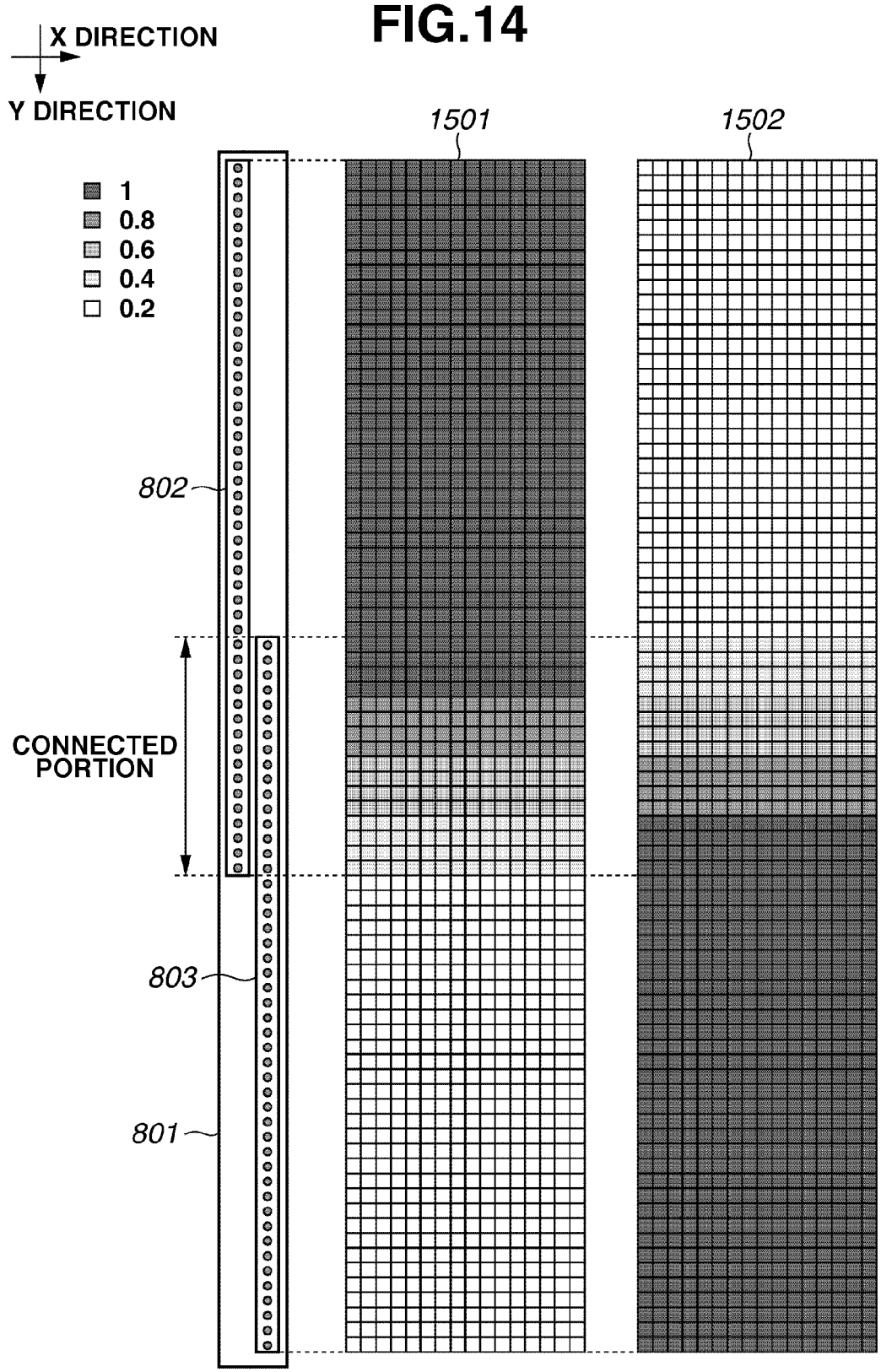
FIG. 14 is a schematic view illustrating a positional relationship between a recording head and connection masks according to a second exemplary embodiment of the present invention, and an example configuration of the connection masks.

FIG. 14 is a schematic view illustrating a positional relationship between the recording head 801 and multi-valued connection masks and an example configuration of a pair of multi-valued connection masks according to the present exemplary embodiment. The example illustrated in FIG. 14 is a combination of a connection mask 1501 for the first recording element array 802 and a connection mask 1502 for the second recording element array 803.

The recording rate of each recording element can be determined based on values of data that are present in the direction X (i.e., in the direction perpendicular to the recording element array) of the connection mask. The recording rates of recording elements in a non-connected portion are 100% because the data present in the direction X (i.e., in the direction perpendicular to the recording element array) is all "1."

On the other hand, the recording rates of recording elements in the connected portion are less than 100% because the data present in the direction perpendicular to the recording element array is real numbers in the range from "0" to "1." Further, in the connected portion, the sum of a recording rate by the connection mask 1501 for the first recording element array 802 and a recording rate by the connection mask 1502 for the second recording element array 803 is equal to 100%.

Figure 15:
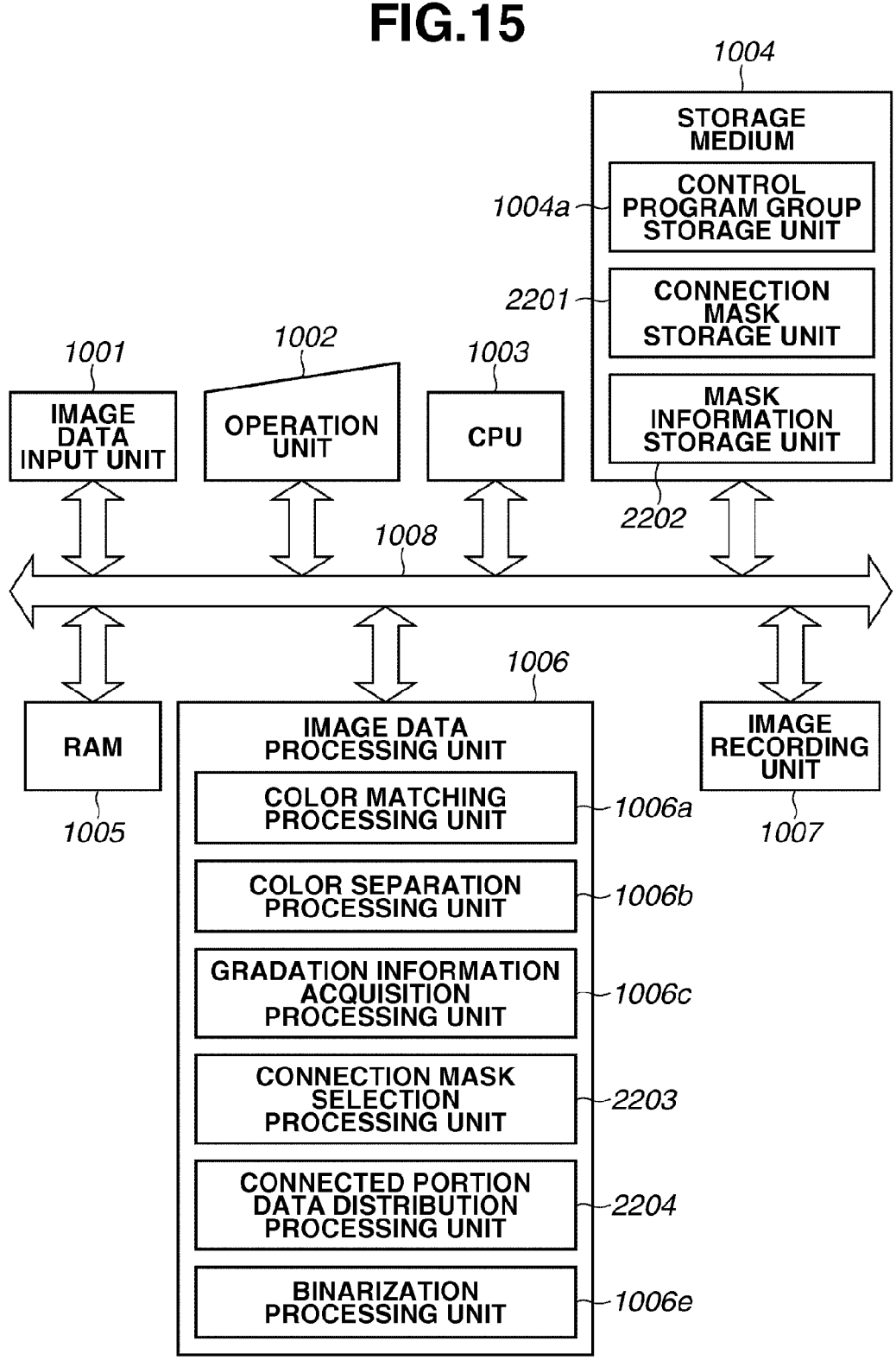
FIG. 15 is a block diagram illustrating an example of a configuration of a control system for an inkjet recording apparatus according to the second exemplary embodiment.

FIG. 15 is block diagram illustrating an example of a configuration of a control system for the inkjet recording apparatus according to the second exemplary embodiment. A connection mask storage unit 2201 can store multi-valued connection masks. A mask information storage unit 2202 can store information representing the visibility of streaks appearing in an image region corresponding to a connected portion extending between two recording element arrays in a case where the multi-valued connection masks are used to perform recording.

Further, a connection mask selection processing unit 2203 can select a multi-valued connection mask. A connected portion data distribution processing unit 2204 can distribute multi-valued CMYK data. The rest of the configuration illustrated in FIG. 15 is similar to the corresponding part of the first exemplary embodiment described with reference to FIG. 9.

Figure 16:
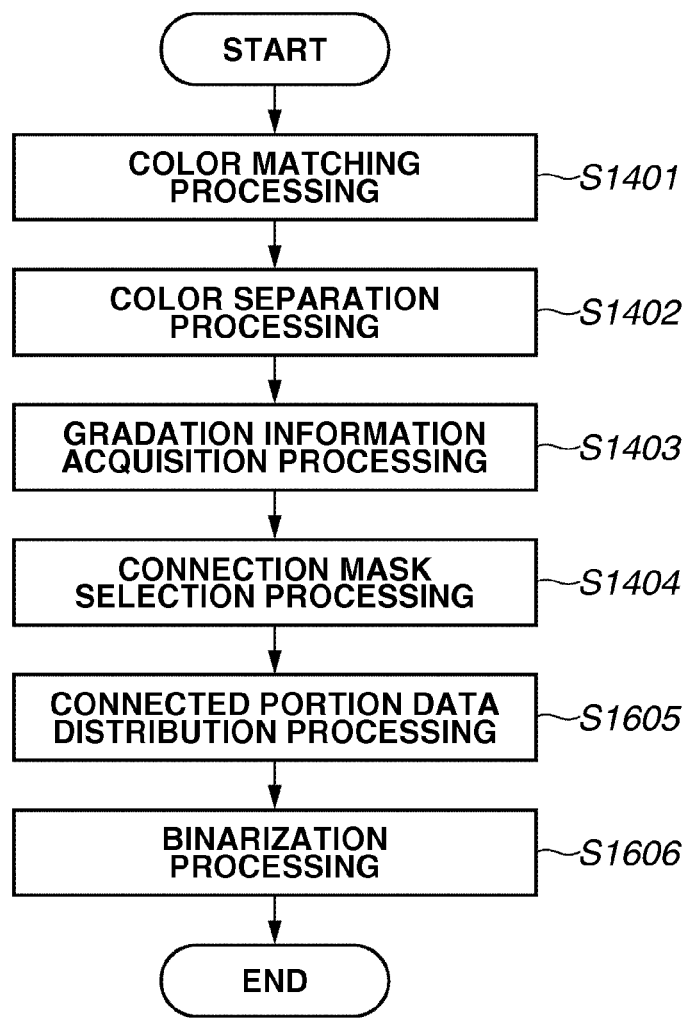
FIG. 16 is a flowchart illustrating an example of a procedure of image data processing according to the second exemplary embodiment.

FIG. 16 is a flowchart illustrating an example of image data processing according to the second exemplary embodiment. The flowchart illustrated in FIG. 16 is different from the flowchart descried in the first exemplary embodiment in that the connected portion data distribution processing and the binarization processing are switched in the execution order. The rest of the flowchart illustrated in FIG. 16 is similar to the corresponding part of the flowchart according to the first exemplary embodiment illustrated in FIG. 13.

In step S1605, the connected portion data distribution processing unit 1006*f* performs processing for obtaining a product of the multi-valued connection mask selected in step S1404 and the multi-valued CMYK data generated by the color separation processing unit 1006*b* (see step S1402) to generate multi-valued distribution data for each of a plurality of recording element arrays.

In step S1606, the binarization processing unit 1006*e* binarizes the multi-valued distribution data to generate binary data for each recording element array.

As described above, the image recording apparatus according to the second exemplary embodiment can prevent or reduce undesirable streaks from being generated in an image region corresponding to a connected portion extending between two recording element arrays to attain a goal of obtaining high-quality recorded images while realizing speedy recording processing.

The recording apparatus described in the first exemplary embodiment is the full line type inkjet recording apparatus that has a long recording region comparable to the entire surface of a recording medium. A third exemplary embodiment of the present invention is based on a serial type inkjet recording apparatus that includes a carriage capable of discharging ink onto a recording medium while moving in the main scanning direction. The serial type inkjet recording apparatus according to the present exemplary embodiment is an example of the recording apparatus that can perform multi-pass recording, in which the carriage performs scanning two or more times in the same region of a recording medium to record an image.

Figure 17:
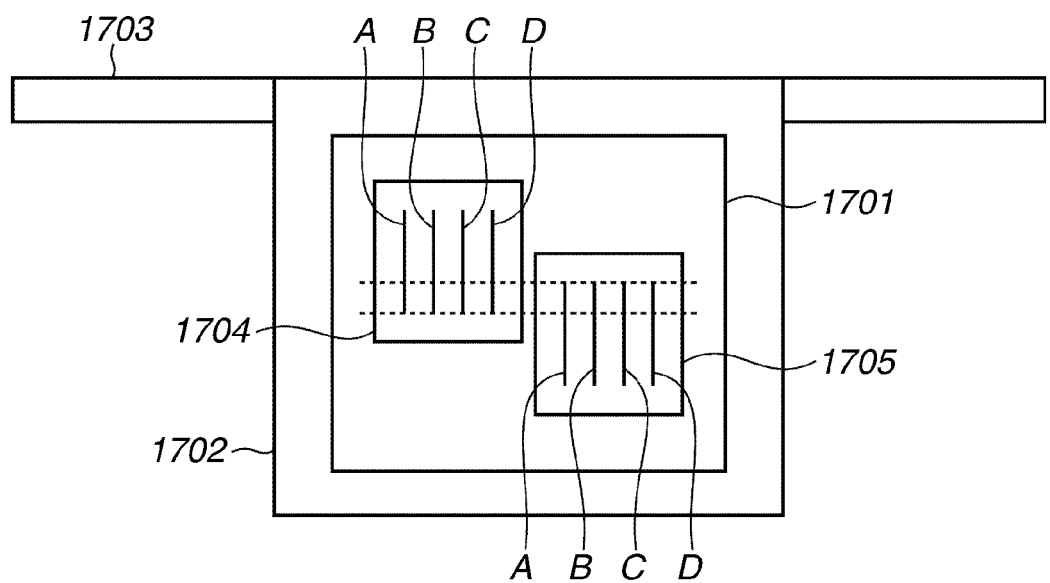
FIG. 17 is a see-through view illustrating an example of a configuration of a serial type inkjet recording apparatus according to a third exemplary embodiment of the present invention.

FIG. 17 is a see-through view illustrating an example of a configuration of the serial type inkjet recording apparatus.

As illustrated in FIG. 17, a serial type recording head 1701 includes a first chip 1704 and a second chip 1705. The serial type recording head 1701 is mounted on a carriage 1702, which can slide relative to a shaft 1703. The serial type recording head 1701 can perform recording when the carriage 1702 moves in the forward and backward directions in the main scanning operation in a state where the carriage 1702 is slidably supported by the shaft 1703.

Each of the first and second recording chips 1704 and 1705 includes four recording element arrays that are disposed in parallel with each other to constitute four rows A to D. The recording element array that constitutes the row A can be used to perform recording with a black ink. The recording element array that constitutes the row B can be used to perform recording with a cyan ink.

The recording element array that constitutes the row C can be used to perform recording with a magenta ink. The recording element array that constitutes the row D can be used to perform recording with a yellow ink. The first and second recording chips 1704 and 1705 are disposed in a predetermined relationship so as to be partly overlapped with each other. A connected portion existing between the first and second recording chips 1704 and 1705 is similar in configuration to the connected portion illustrated in FIG. 6.

Figure 18:
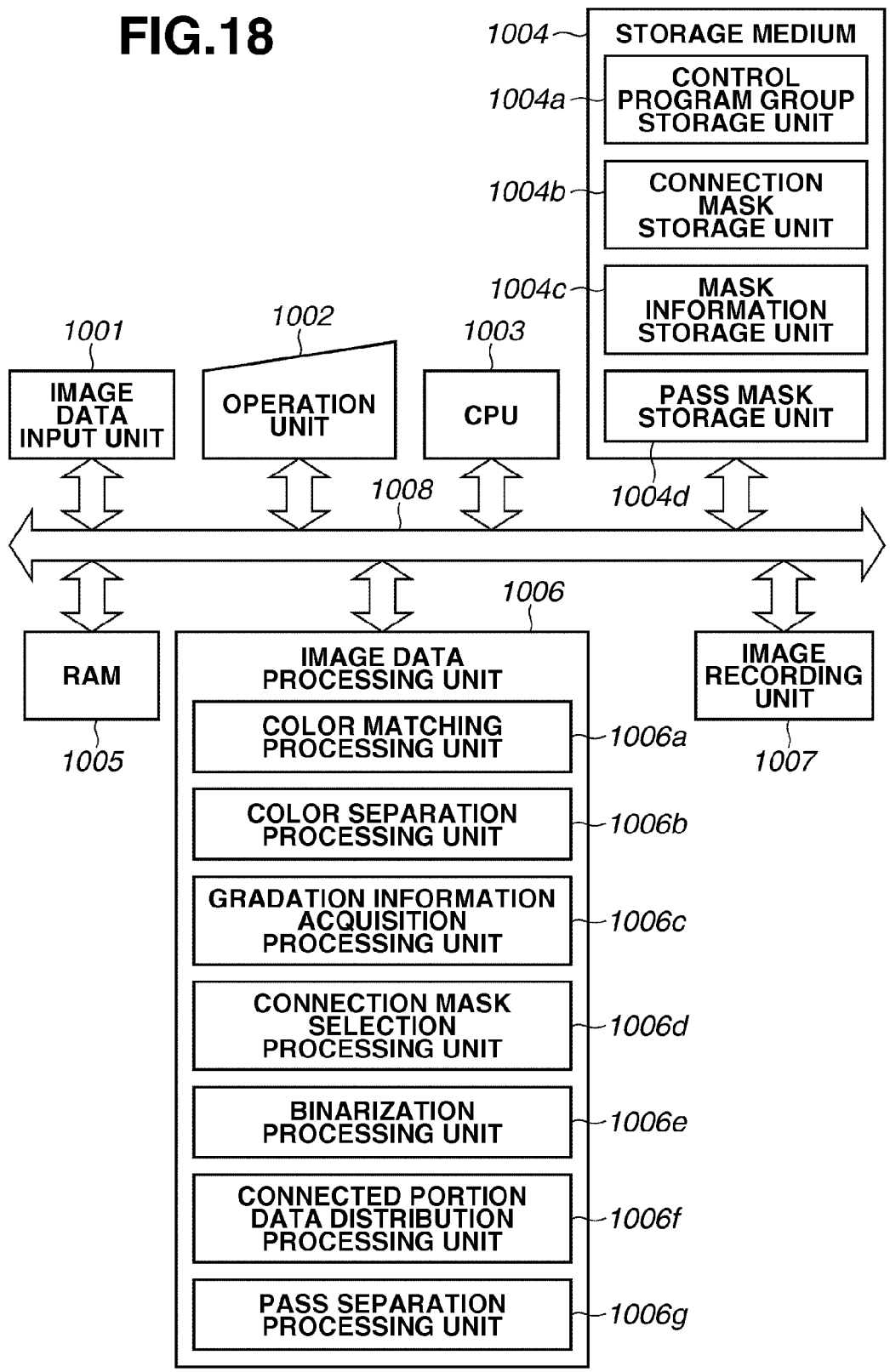
FIG. 18 is a block diagram illustrating an example of a configuration of a control system for an inkjet recording apparatus according to the third exemplary embodiment.

FIG. 18 is a block diagram illustrating an example of a configuration of a control system for an inkjet recording apparatus according to the present exemplary embodiment. Compared to the first exemplary embodiment, the control system according to the present exemplary embodiment includes a pass mask storage unit 1004d and a pass separation processing unit 1006g, which can be used to perform multi-pass recording. The rest of the configuration illustrated in FIG. 18 is similar to the corresponding part of the first exemplary embodiment described with reference to FIG. 9.

The pass separation processing unit 1006g performs processing for separating the binary dot layout pattern generated by the connected portion data distribution unit 1006f, using a pass mask stored in the pass mask storage unit 1004d, into binary dot layout patterns to be used for recording in respective passes.

The pass mask is a mask pattern constructed by binary (i.e., "1" or "0") data. The binary dot layout pattern to be used for recording in each pass can be generated by obtaining a logical AND of a binary dot layout pattern to be recorded by each recording element array and a pass mask. In the present exemplary embodiment, a pass mask P1 can be used to generate an image in the first pass and a pass mask P2 can be used to generate an image in the second pass when the image recording apparatus performs two-pass recording.

Further, the pass masks P1 and P2 can satisfy the following relationship.

$$P1+P2=1$$

$$P1 \times P2=0$$

In the above-described formulae, "+" represents a logical OR calculation and "×" represents a logical AND calculation.

The binary dot layout pattern to be used in the two-pass recording can be generated by obtaining a logical AND of a binary dot layout pattern to be recorded by each recording element array and a pass mask in the following manner. The present exemplary embodiment uses the following expressions to represent binary dot layout patterns to be recorded by respective recording element arrays, which can be generated by the connected portion data distribution unit 1006f.

More specifically, Out1_K, Out1_C, Out1_M, and Out1_Y represent binary dot layout patterns to be recorded by the rows A, B, C, and D of the recording chip 1704 illustrated in FIG. 17. Similarly, Out2_K, Out2_C, Out2_M, and Out2_Y represent binary dot layout patterns to be recorded by the rows A, B, C, and D of the recording chip 1705 illustrated in FIG. 17.

As an example, the present exemplary embodiment indicates a method for generating binary dot layout patterns Out1_K_1 and Out1_K_2 to be recorded by the row A of the recording chip 1704 according to the two-pass recording. Further, the present exemplary embodiment indicates a method for generating binary dot layout patterns Out2_K_1 and Out2_K_2 to be recorded by the row A of the recording chip 1705 according to the two-pass recording.

Similarly, the present exemplary embodiment can generate binary dot layout patterns to be recorded by the rows B, C, and D of the recording chip 1704 according to the two-pass recording, as well as binary dot layout patterns to be recorded by the rows B, C, and D of the recording chip 1705 according to the two-pass recording, using similar formulae.

$$Out1\_K\_1 = Out1\_K \times P1$$

$$Out1\_K\_2 = Out1\_K \times P2$$

$$Out2\_K\_1 = Out2\_K \times P1$$

$$Out2\_K\_2 = Out2\_K \times P2$$

In the above-described formulae, "×" represents the logical AND calculation.

Figure 19:
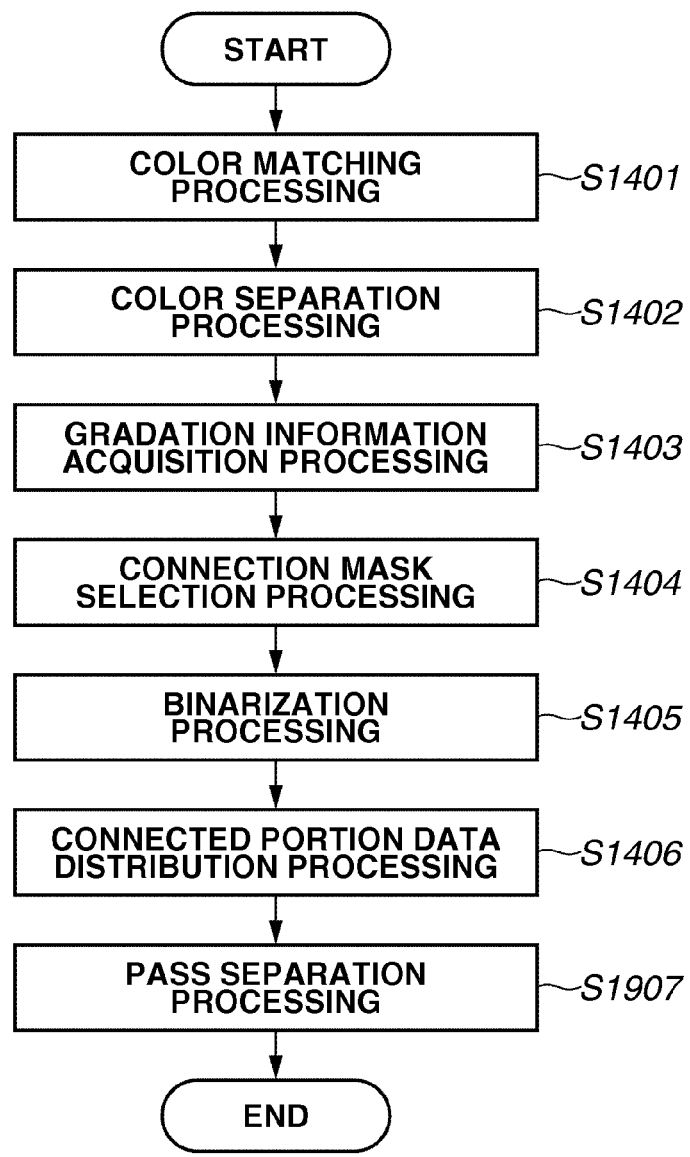
FIG. 19 is a flowchart illustrating an example of a procedure of image data processing according to the third exemplary embodiment.

FIG. 19 is a flowchart illustrating an example of image data processing according to the present exemplary embodiment. The processing illustrated in FIG. 19, except for step S1907, is similar to the processing according to the first exemplary embodiment illustrated in FIG. 13.

In step S1907, the pass separation processing unit 1006g performs processing for separating the binary dot layout pattern to be recorded by each recording element array, which is generated in step S1406, into binary dot layout patterns to be used in the two-pass recording.

As described above, the image recording apparatus according to the third exemplary embodiment can prevent or reduce undesirable streaks from being generated in an image region corresponding to a connected portion extending between two recording element arrays to attain a goal of obtaining high-quality recorded images while realizing speedy recording processing.

To generate the binary dot layout patterns to be used by respective recording element arrays to perform recording in each pass, the third exemplary embodiment distributes the binary dot layout pattern generated by the binarization processing (see step S1405) through two-step mask processing performed in steps S1406 and S1907.

However, the above-described distribution processing can be accomplished through single mask processing. In this case, to eliminate streaks appearing in an image region corresponding to a connected portion extending between two recording element arrays, the present exemplary embodiment changes the pass masks (not the connection masks) according to the gradation.

The reason why the above-described two-step mask processing can be replaced with the single mask processing is described below with reference to the third exemplary embodiment. Hereinafter, a method for generating binary dot layout patterns to be recorded in respective passes by the row A of the recording chip 1704 and the row A of the recording chip 1705 that can record the K coloring material is described below.

In the present exemplary embodiment, the row A of the recording chip 1704 records the binary dot layout patterns Out1_K_1 and Out1_K_2 according to the two-pass recording. Similarly, the row A of the recording chip 1705 records the binary dot layout patterns Out2_K_1 and Out2_K_2 according to the two-pass recording.

Further, in the connection mask "a", the connection mask "b", and the connection mask "c" according to the third exemplary embodiment, mask patterns M1_a, M1_b, and M1_c can be applied to the row A of the recording chip 1704. These mask patterns M1_a, M1_b, and M1_c correspond to the connection mask 804 illustrated in FIG. 7. Similarly, mask patterns M2_a, M2_b, and M2_c can be applied to the row A of the recording chip 1705. These mask patterns M2_a, M2_b, and M2_c correspond to the connection mask 805 illustrated in FIG. 7.

In the following description, Out_K represents a binary dot layout pattern of the coloring material K, which is generated in step S1405. For the sake of convenience, it is assumed that the binary dot layout pattern Out_K has a size comparable to that of the mask patterns M1_a, M1_b, M1_c, M2_a, M2_b, and M2_c. Further, the binary dot layout pattern Out_K can be distributed to any one of the connection mask "a", the connection mask "b", and the connection mask "c" according to the gradation.

In the third exemplary embodiment, the binary dot layout patterns Out1_K_1, Out1_K_2, Out2_K_1, and Out2_K_2 to be recorded according to the two-pass recording can be obtained according to the following formulae. In the following formula, P1 and P2 represent the pass masks described in the third exemplary embodiment. For the sake of convenience, it is now assumed that the mask patterns M1_a, M1_b, M1_c, M2_a, M2_b, and M2_c are comparable in size.

(If the connection mask "a" is used)

$$Out1\_K\_1 = Out\_K \times M1\_a \times P1$$

$$Out1\_K\_2 = Out\_K \times M1\_a \times P2$$

$$Out2\_K\_1 = Out\_K \times M2\_a \times P1$$

$$Out2\_K\_2 = Out\_K \times M2\_a \times P2$$

(If the connection mask "b" is used)

$$Out1\_K\_1 = Out\_K \times M1\_b \times P1$$

$$Out1\_K\_2 = Out\_K \times M1\_b \times P2$$

$$Out2\_K\_1 = Out\_K \times M2\_b \times P1$$

$$Out2\_K\_2 = Out\_K \times M2\_b \times P2$$

(If the connection mask "c" is used)

$$Out1\_K\_1 = Out\_K \times M1\_c \times P1$$

$$Out1\_K\_2 = Out\_K \times M1\_c \times P2$$

$$Out2\_K\_1 = Out\_K \times M2\_c \times P1$$

$$Out2\_K\_2 = Out\_K \times M2\_c \times P2$$

In the above-described formulae, "×" represents the logical AND calculation.

The following formulae are single mask patterns that aggregate two mask patterns on the right side of the above-described formulae.

$$M1\_a1 = M1\_a \times P1$$

$$M1\_a2 = M1\_a \times P2$$

$$M2\_a1 = M2\_a \times P1$$

$$M2\_a2 = M2\_a \times P2$$

$$M1\_b1 = M1\_b \times P1$$

$$M1\_b2 = M1\_b \times P2$$

$$M2\_b1 = M2\_b \times P1$$

$$M2\_b2 = M2\_b \times P2$$

$$M1\_c1 = M1\_c \times P1$$

$$M1\_c2 = M1\_c \times P2$$

$$M2\_c1 = M2\_c \times P1$$

$$M2\_c2 = M2\_c \times P2$$

In the above-described formulae, "×" represents the logical AND calculation.

Therefore, the binary dot layout patterns Out1_K_1, Out1_K_2, Out2_K_1, and Out2_K_2, which are recorded according to the two-pass recording in the third exemplary embodiment, can be generated using the aggregate mask patterns in the following manner.

(If the connection mask "a" is used)

$$Out1\_K\_1 = Out\_K \times M1\_a1$$

$$Out1\_K\_2 = Out\_K \times M1\_a2$$

$$Out2\_K\_1 = Out\_K \times M2\_a1$$

$$Out2\_K\_2 = Out\_K \times M2\_a2$$

(If the connection mask "b" is used)

$$Out1\_K\_1 = Out\_K \times M1\_b1$$

$$Out1\_K\_2 = Out\_K \times M1\_b2$$

$$Out2\_K\_1 = Out\_K \times M2\_b1$$

$$Out2\_K\_2 = Out\_K \times M2\_b2$$

(If the connection mask "c" is used)

$$Out1\_K\_1 = Out\_K \times M1\_c1$$

$$Out1\_K\_2 = Out\_K \times M1\_c2$$

$$Out2\_K\_1 = Out\_K \times M2\_c1$$

$$Out2\_K\_2 = Out\_K \times M2\_c2$$

In the above-described formulae, "×" represents the logical AND calculation.

As described above, the binary dot layout patterns Out1_K_1, Out1_K_2, Out2_K_1, and Out2_K_2 to be recorded according to the two-pass recording can be generated by using the aggregated mask patterns as pass masks. In other words, the above-described two-step mask processing can be replaced with the single mask processing.

An example of a configuration for realizing a fourth exemplary embodiment of the present invention is described below. Similar to the third exemplary embodiment, the fourth exemplary embodiment can be realized by the serial type inkjet recording apparatus illustrated in FIG. 17.

Figure 20:
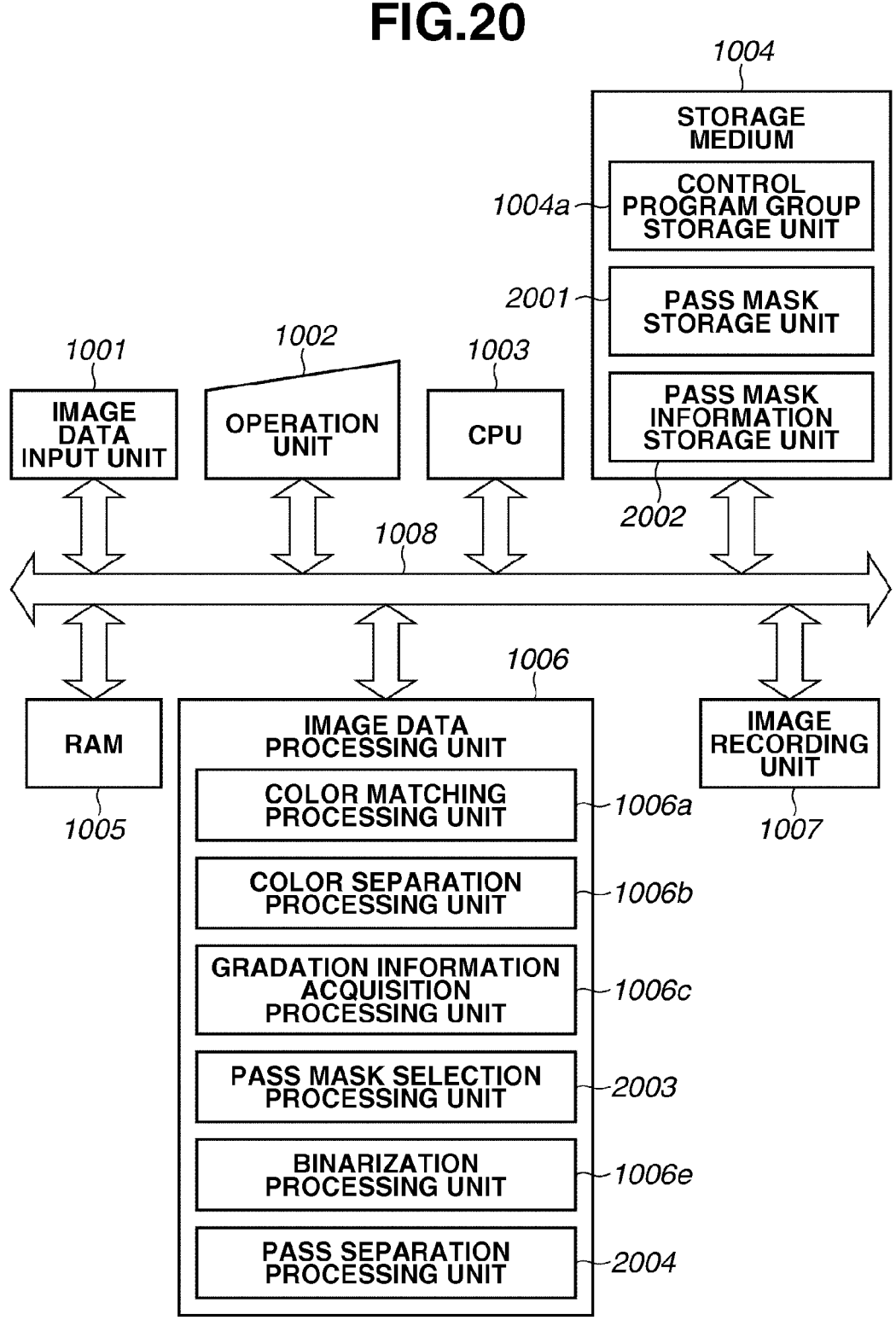
FIG. 20 is a block diagram illustrating an example of a configuration of a control system for an inkjet recording apparatus according to a fourth exemplary embodiment of the present invention.

FIG. 20 is a block diagram illustrating an example of a configuration of a control system for an inkjet recording apparatus according to the fourth exemplary embodiment.

The configuration illustrated in FIG. 20 is different from the above-described configuration according to the third exemplary embodiment in that a pass mask storage unit 2001, a pass mask information storage unit 2002, a pass mask selection processing unit 2003, and a pass separation processing unit 2004 are provided. The rest of the configuration illustrated in FIG. 20 is similar to the corresponding part of the third exemplary embodiment described with reference to FIG. 18.

The pass mask storage unit 2001 can store the above-described aggregated mask patterns M1_a1, M1_a2, M2_a1, M2_a2, M1_b1, M1_b2, M2_b1, M2_b2, M1_c1, M1_c2, M2_c1, and M2_c2.

The pass mask information storage unit 2002 can store information representing the visibility of streaks appearing in an image region corresponding to a connected portion extending between two recording element arrays in a case where the aggregated mask patterns are used to perform recording.

The pass mask selection processing unit 2003 can select a pass mask for each coloring material to record an image that includes a smaller amount of streaks in an image region corresponding to a connected portion extending between two recording element arrays, from the masks stored in the pass mask storage unit 2002, based on an average value for each coloring material calculated by the gradation information acquisition processing unit 1006c.

In this case, the pass mask selection processing unit 2003 can refer to the information stored in the pass mask information storage unit 2002 to determine the pass mask capable of recording an image that includes a smaller amount of streaks in an image region corresponding to a connected portion extending between two recording element arrays.

The pass separation processing unit 2004 can separate the binary dot layout pattern for each coloring material generated by the binarization processing unit 1006e, using the pass mask stored in the pass mask storage unit 2001, into binary dot layout patterns to be used for recording in respective passes.

Figure 21:
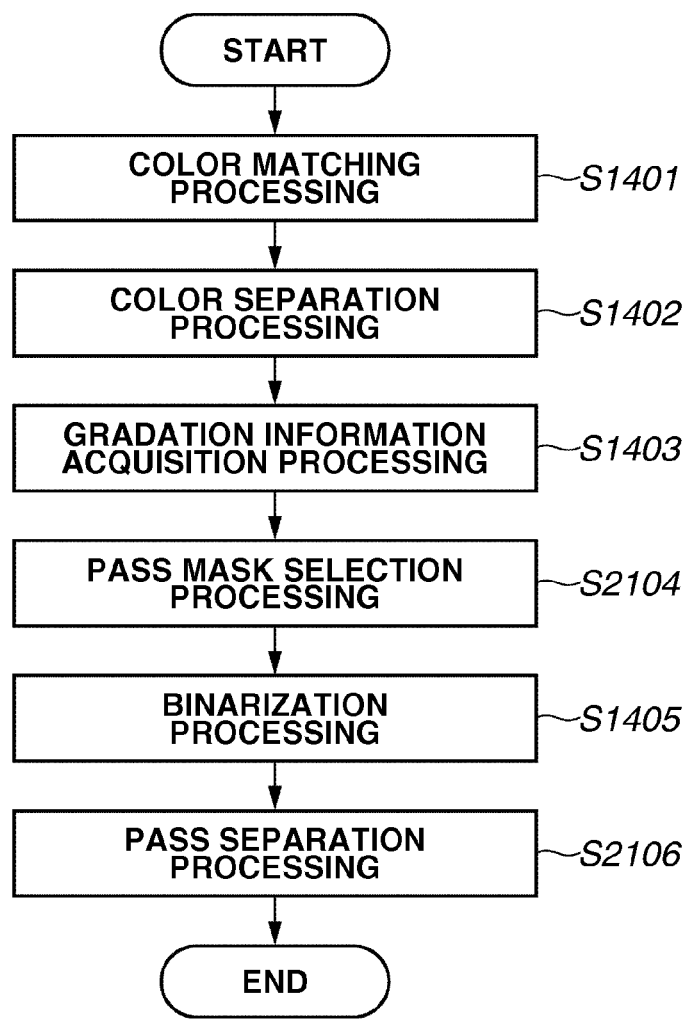
FIG. 21 is a flowchart illustrating an example of a procedure of image data processing according to the fourth exemplary embodiment.

FIG. 21 is a flowchart illustrating an example of a procedure of image data processing according to the present exemplary embodiment. The processing flow illustrated in FIG. 21 is similar to the processing flow described in the third exemplary embodiment except that the connection mask selection processing step (step S1404) is replaced by pass mask selection processing (step S2104) and further the connected portion data distribution processing (step S1406) and the pass separation processing (step S1907) are aggregated into pass separation processing (step S2106).

As described above, the image recording apparatus according to the fourth exemplary embodiment can prevent or reduce undesirable streaks from being generated in an image region corresponding to a connected portion extending between two recording element arrays to attain a goal of obtaining high-quality recorded images while realizing speedy recording processing.

In the above-described exemplary embodiment, the mask information storage unit stores measurement results with respect to the visibility of streaks appearing in an image region corresponding to a connected portion extending between two recording element arrays, which can be generated when a plurality of mask patterns stored in the connection mask storage unit are used to record, with each coloring material, a plurality of test image data that are different in gradation.

However, the mask information storage unit can include a table storing mask information selectable according to an average value, instead of storing the measurement results. When a connection mask is selected, the connection mask can be selected referring to the table based on the average value.

The above-described exemplary embodiment uses an average value of image data corresponding to the connected portion extending between two recording element arrays as gradation information calculated by the gradation information acquisition processing unit. The gradation information can be any other value that represents the density characteristics of image data corresponding to the connected portion extending between two recording element arrays. For example, the gradation information can be a weighted average value that is weighted according to each region, a simply summed value, a central value, or a gradation level (other than 0) that is highest in frequency of occurrence.

The above-described configuration according to the second exemplary embodiment, which uses multi-valued masks, can be applied to the serial type inkjet recording apparatus described in the third exemplary embodiment and the fourth exemplary embodiment.

Further, a computer can execute a program stored in a RAM or a read only memory (ROM) thereof to realize each unit that constitutes the recording apparatus according to the above-described exemplary embodiments of the present invention.

Figure 13:
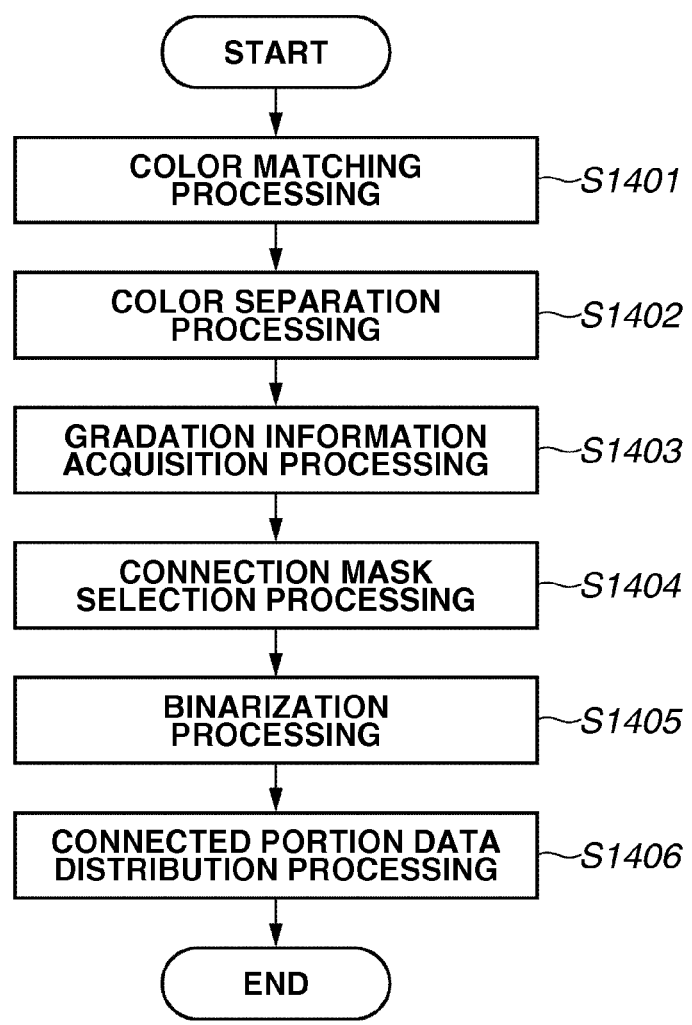
FIG. 13 is a flowchart illustrating an example of a procedure of image data processing according to the first exemplary embodiment.

It is useful to supply software programs, directly or from a remote place, to a system or an apparatus, if the software programs can execute each step of the above-described recording methods (i.e., the flowcharts illustrated in FIGS. 13, 16, and 19 in the above-described exemplary embodiments). Then, a single or a plurality of processors of the system or the apparatus can read and execute the supplied program code to realize the present invention.

In this case, an external apparatus can execute the processing for determining binary data of each recording element array and all of the preceding processing. The external apparatus can transfer the determined binary data to a recording apparatus. The recording apparatus can perform recording based on the transferred data.

Accordingly, when a recording apparatus performs the above-described image data processing, the recording apparatus can serve as an image processing apparatus according to an exemplary embodiment of the present invention. When an external apparatus performs the above-described image data processing, the external apparatus can serve as an image processing apparatus according to an exemplary embodiment of the present invention.

In the context of the present specification, the term "recording" includes not only formation of meaningful information (e.g., characters, graphics, etc.) but also formation of any meaningless information. The term "recording" further includes formation of an image, a design, or a pattern on a recording medium, and includes processing applied to a medium. Moreover, the term "recording" includes formation of both visible and invisible information.

Further, the term. "recording medium" denotes a paper usable in a general recording apparatus, a cloth, a plastic film, a metallic plate, a glass plate, a ceramic member, a wood plate, a leather sheet, or any other material that can absorb an ink.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-288967 filed Nov. 11, 2008 and No.

2009-244716 filed Oct. 23, 2009, which are hereby incorporated by reference herein in their entirety.

What is claimed is:

1. An image recording apparatus configured to record an image on a recording medium using a recording head having a plurality of recording chips that are equipped with recording element arrays, wherein the recording chips are arranged in a direction parallel to the recording element arrays, wherein a part of the image on the recording medium is formed by overlapping images recorded by connected portions that are parts of the different recording tips, the image recording apparatus comprising:
   an acquisition unit configured to acquire, from image data, gradation information in a region corresponding to a connected portion;
   a setting unit configured to set, based on the gradation information, control information for controlling recording rates of respective recording elements of the plurality of recording chips; and
   a generation unit configured to, according to the set control information, generate, from the image data, dot data for respective recording elements of the plurality of recording chips.

2. The image recording apparatus according to claim 1, wherein the setting unit is configured to set a mask based on the gradation information, and
   wherein the generation unit is configured to generate the dot data from the input image data and to distribute the generated dot data, using the set mask, to respective recording elements of the plurality of recording chips.

3. The image recording apparatus according to claim 1, wherein the setting unit is configured to set a multi-valued mask based on the gradation information, and
   wherein the generation unit is configured to use the set multi-valued mask to distribute the image data to respective recording elements of the plurality of recording chips that are connected in the overlapped state, and to generate, from the distributed image data, the dot data for respective recording elements of the plurality of recording chips.

4. The image recording apparatus according to claim 1, wherein the recording head is configured to perform scanning a plurality of times in a same region on the recording medium to record an image thereon, and
   wherein the generation unit is configured to generate, from the image data, dot data to be used in each scanning for respective recording elements of the plurality of recording chips.

5. The image recording apparatus according to claim 1, wherein the setting unit is configured to set the recording rates of the overlapped recording elements to be larger in maximum change amount in a case where the gradation information indicates a higher density than in a case where the gradation information indicates a lower density.

6. The image recording apparatus according to claim 1, wherein the image recording apparatus is configured to perform recording with a plurality of coloring materials,
   wherein the acquisition unit is configured to acquire the gradation information for each coloring material, and
   wherein the setting unit is configured to set the control information for each coloring material.

7. An image processing method for generating dot data for an image recording apparatus configured to record an image on a recording medium using a recording head having a plurality of recording chips that are equipped with recording element arrays, wherein the recording chips are in a direction parallel to the recording element arrays, wherein a part of the image on the recording medium is formed by overlapping images recorded by connected portions that are parts of the different recording tips, the image processing method comprising:
   acquiring, from image data, gradation information in a region corresponding to a connected portion;
   setting, based on the gradation information, control information for controlling recording rates of respective recording elements of the plurality of recording chips; and
   according to the set control information, generating, from the image data, dot data for respective recording elements of the plurality of recording chips.

8. A non-transitory computer-readable storage medium storing a program for causing an image recording apparatus to record an image on a recording medium using a recording head having a plurality of recording chips that are equipped with recording element arrays, wherein the recording chips are in a direction parallel to the recording element arrays, wherein a part of the image on the recording medium is formed by overlapping images recorded by connected portions that are parts of the different recording tips, the program comprising:
   computer-executable instructions for acquiring, from image data, gradation information in a region corresponding to a connected portion;
   computer-executable instructions for setting, based on the gradation information, control information for controlling recording rates of respective recording elements of the plurality of recording chips; and
   computer-executable instructions for, according to the set control information, generating, from the image data, dot data for respective recording elements of the plurality of recording chips.

9. An image recording apparatus configured to record an image on a recording medium using a plurality of recording chips, wherein a part of the image on the recording medium is formed by overlapping images recorded by connected portions that are parts of the different recording chips, the image recording apparatus comprising:
   an acquisition unit configured to acquire, from image data, gradation information in a region corresponding to a connected portion;
   a setting unit configured to set, based on the gradation information, control information for controlling recording of respective recording elements of the plurality of recording chips; and
   a generation unit configured to, according to the set control information, generate, from the image data, dot data for respective recording elements of the plurality of recording chips.

10. The image recording apparatus according to claim 9, wherein the setting unit is configured to set a mask based on the gradation information, and
    wherein the generation unit is configured to generate the dot data from the input image data and to distribute the generated dot data, using the set mask, to respective recording elements of the plurality of recording chips.

11. The image recording apparatus according to claim 9, wherein the setting unit is configured to set a multi-valued mask based on the gradation information, and
    wherein the generation unit is configured to use the set multi-valued mask to distribute the image data to respective recording elements of the plurality of recording chips that are connected in the overlapped state, and to generate, from the distributed image data, the dot data for respective recording elements of the plurality of recording chips.

12. The image recording apparatus according to claim 9, wherein the recording head is configured to perform scanning a plurality of times in a same region on the recording medium to record an image thereon, and
wherein the generation unit is configured to generate, from the image data, dot data to be used in each scanning for respective recording elements of the plurality of recording chips.

13. The image recording apparatus according to claim 9, wherein the setting unit is configured to set the recording rates of the overlapped recording elements to be larger in maximum change amount in a case where the gradation information indicates a higher density than in a case where the gradation information indicates a lower density.

14. The image recording apparatus according to claim 9, wherein the image recording apparatus is configured to perform recording with a plurality of coloring materials, wherein the acquisition unit is configured to acquire the gradation information for each coloring material, and
wherein the setting unit is configured to set the control information for each coloring material.

15. An image recording method for recording an image on a recording medium using a plurality of recording chips, wherein a part of the image on the recording medium is formed by overlapping images recorded by connected portions that are parts of the different recording chips, the method comprising:

acquiring, from image data, gradation information in a region corresponding to a connected portion;

setting, based on the gradation information, control information for controlling recording of respective recording elements of the plurality of recording chips; and according to the set control information, generating, from the image data, dot data for respective recording elements of the plurality of recording chips.

16. A non-transitory computer-readable storage medium storing a program for causing an image recording apparatus to record an image on a recording medium using a plurality of recording chips, wherein a part of the image on the recording medium is formed by overlapping images recorded by connected portions that are parts of the different recording chips, the program comprising:

computer-executable instructions for acquiring, from image data, gradation information in a region corresponding to a connected portion;

computer-executable instructions for setting, based on the gradation information, control information for controlling recording of respective recording elements of the plurality of recording chips; and computer-executable instructions for according to the set control information, generating, from the image data, dot data for respective recording elements of the plurality of recording chips.

* * * * *